(12) United States Patent
MacGregor et al.

(10) Patent No.: US 12,455,569 B1
(45) Date of Patent: Oct. 28, 2025

(54) INTELLIGENT VEHICLE PULL OVER

(71) Applicant: Zoox, Inc., Foster City, CA (US)

(72) Inventors: Collin MacGregor, Redwood City, CA (US); Ravi Gogna, San Jose, CA (US); Udayan Pushparaj Karmarkar, Sunnyvale, CA (US); Satya Rama Aditya Pinapala, Santa Clara, CA (US); Aaron Rosekind, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 229 days.

(21) Appl. No.: 17/958,146

(22) Filed: Sep. 30, 2022

(51) Int. Cl.
G05D 1/00 (2024.01)

(52) U.S. Cl.
CPC ......... G05D 1/0077 (2013.01); G05D 1/0038 (2013.01); G05D 1/0214 (2013.01)

(58) Field of Classification Search
CPC ... G05D 1/0077; G05D 1/0038; G05D 1/0214
See application file for complete search history.

(56) References Cited

U.S. PATENT DOCUMENTS

| | | | | |
|---|---|---|---|---|
| 2017/0336788 | A1* | 11/2017 | Iagnemma | G05D 1/0246 |
| 2019/0011910 | A1* | 1/2019 | Lockwood | G05D 1/0038 |
| 2019/0235499 | A1* | 8/2019 | Kazemi | G01S 17/931 |
| 2020/0310417 | A1* | 10/2020 | Pedersen | G05D 1/0038 |
| 2020/0409358 | A1* | 12/2020 | Gogna | G05D 1/0061 |
| 2024/0111284 | A1* | 4/2024 | Bilonenko | G05D 1/0291 |

* cited by examiner

Primary Examiner — Anne Marie Antonucci
Assistant Examiner — Luis G Del Valle
(74) Attorney, Agent, or Firm — Lee & Hayes, P.C.

(57) ABSTRACT

Techniques for intelligent vehicle pull over in response to detecting abnormal conditions. The techniques may include determining a presence of a condition necessitating that a vehicle cease from operating on a road surface and determining a constraint associated with the vehicle ceasing from operating on the road surface. In some examples, the constraint may be a time constraint, a geographical constraint, and/or the like. The techniques may also include sending, to a planner component of the vehicle, an indication that the vehicle is to cease from operating on the road surface in accordance with the constraint. Additionally, based at least in part on a determination that the planner component acknowledged the indication in accordance with the constraint, the techniques may include refraining from causing the vehicle to stop on the road surface such that the vehicle impedes a flow of traffic.

20 Claims, 9 Drawing Sheets

INTELLIGENT VEHICLE PULL OVER

BACKGROUND

As a vehicle traverses an environment, various circumstances can arise that can make it impractical or unsafe for the vehicle to continue operating. For instance, changes in weather conditions, traffic congestion, deterioration and/or failure of vehicle systems or components, and/or the like can make vehicle operation unsafe or otherwise impractical. In such situations, a driver of the vehicle may stop or otherwise pull the vehicle over and refrain from operating the vehicle again until the condition subsides or is remedied.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
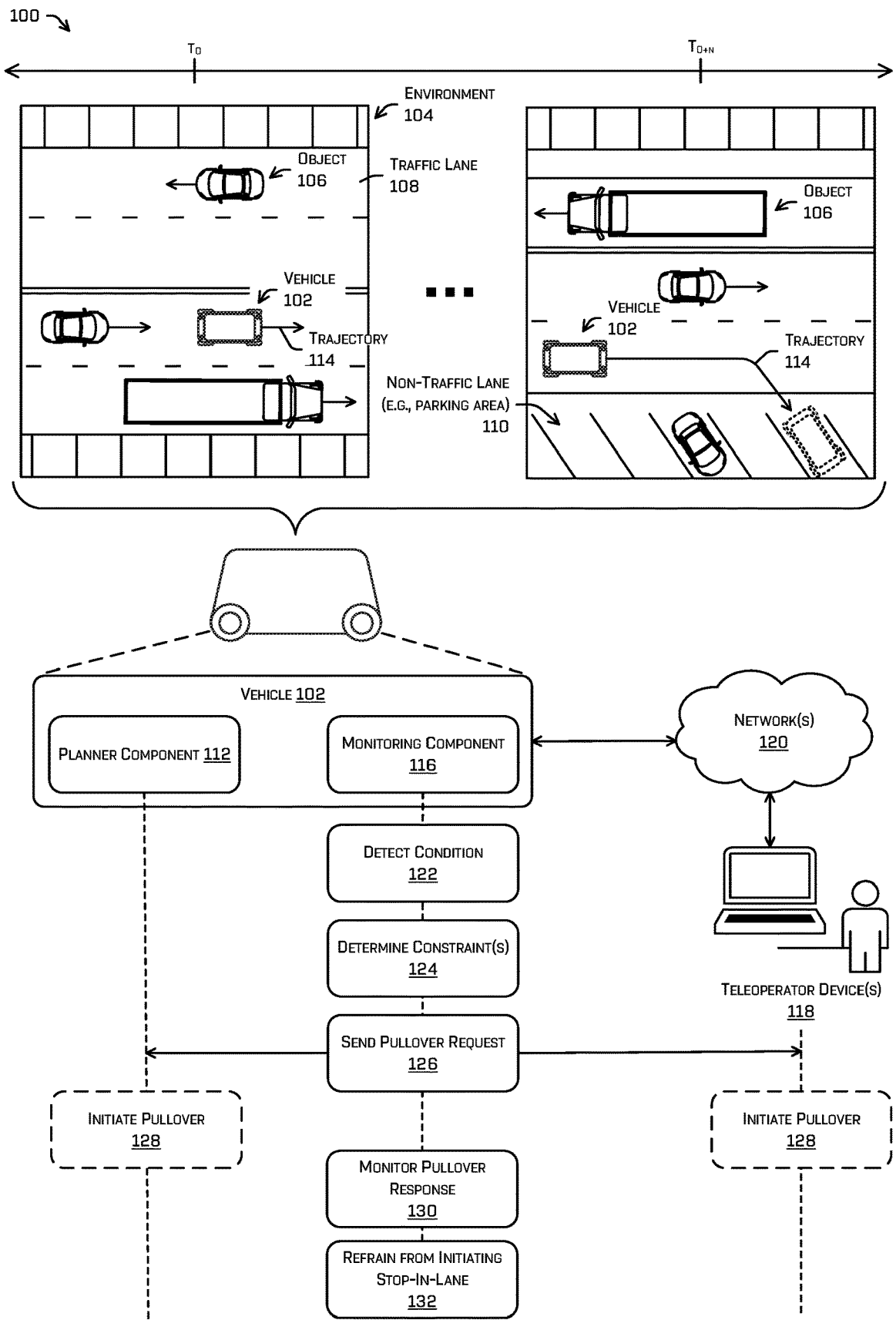
FIG. 1 is a pictorial flow diagram illustrating an example process associated with the technologies disclosed herein for intelligent vehicle pull over.

As discussed above, various circumstances can arise that make it impractical or unsafe for a vehicle to continue operating in an environment. In some of these circumstances, however, the vehicle may still be able to continue operating if precautions are taken. For example, if a vehicle's tire begins to lose pressure, it may be safe to continue operating the vehicle so long as the tire pressure is closely monitored and/or remedied before the tire pressure further deteriorates.

This application is directed to technologies for intelligent vehicle pull over. For instance, if a condition is detected that makes it necessary for a vehicle to pull over or otherwise cease from operating in a traffic lane of a road system, a determination may be made that the vehicle needs to pull over in accordance with one or more constraints. In some instances, these constraints may be time constraints (e.g., an amount of time that the vehicle has to pull over), geographic constraints (e.g., specific locations where the vehicle may be permitted and/or prohibited to pull over), system- or component-related constraints (e.g., do not exceed speed for the vehicle, maximum braking force for the vehicle, etc.), and/or the like. In some examples, an indication that the vehicle needs to pullover in accordance with the constraint(s) may be sent to a planner component of the vehicle and/or to a teleoperator associated with the vehicle (e.g., a human being or a remote system (e.g., computer, machine-learned model, etc.) that monitors operation of the vehicle, which may include providing guidance for the vehicle, at least partially controlling the vehicle, or the like). In this way, based on the indication and the constraint(s), the planner component and/or the teleoperator may determine an optimal time, location, route, etc. for pulling the vehicle over such that the safe operation of the vehicle is not compromised.

To continue the example from above, if the vehicle's tire pressure begins to decrease below an acceptable level, a determination may be made that the vehicle can continue to operate with the decreased/decreasing tire pressure for a certain period of time (e.g., a day, a week, a month, etc.) before the decreased tire pressure may become unsafe. As such, an indication may be sent to the planner component and/or the teleoperator that the vehicle needs to be pulled over before an expiration of the period of time (e.g., the constraint) so that the tire can be re-inflated, patched, or otherwise serviced to restore the tire pressure to the correct pressure. Based on the indication, the planner component and/or the teleoperator can determine an optimal time, location, route, etc. for pulling the vehicle over for service. That is, instead of immediately stopping the vehicle upon detection of the condition, which may cause traffic delays or other unsafe situations (e.g., pulling the vehicle over on a busy freeway, stopping the vehicle in a traffic lane or road shoulder and impeding the flow of traffic, etc.), the vehicle may continue to operate according to the constraint(s) until an optimal pull over location is reached.

In some examples, an independent monitoring system of the vehicle may detect or otherwise determine the presence of the condition necessitating that the vehicle pull over. For instance, this independent monitoring system may be isolated and/or hardened from hardware of the vehicle that is running other high-level systems (e.g., perception system, planning system, prediction system, drive system, etc.). In other words, the independent monitoring system may be a low-level system that operates on one piece of hardware to monitor the high-level systems, which may be running on another piece of hardware, and request actions independently to the other high-level components. In this way, if the hardware that the high-level systems are running on experiences a failure in any way, the redundancy of having the monitoring system run independently on another piece of hardware can ensure that the monitoring system will detect fault conditions and, if so, bring the vehicle to a stop.

By way of example, and not limitation, a method according to the technologies disclosed herein may include techniques of receiving data associated with a vehicle operating in an environment. For instance, the data may be health-related data associated with components or systems of the vehicle (e.g., data indicating whether any components or systems of the vehicle are in a faulted or abnormal state), environmental data (e.g., weather-related data), traffic-related data, occupant related data (e.g., data associated with occupants of the vehicle), or the like.

In some examples, the techniques may include determining a presence of a condition necessitating that the vehicle pull over or otherwise cease from operating on a portion of a road surface. In some instances, the portion of the road surface may be a drivable portion of the road surface, such as a traffic lane, that is designated for vehicle travel and use, as opposed to a non-traffic lane, which may be designated for use by vehicles for parking, emergency stopping, or the like. In some examples, the vehicle may include a monitoring component and the presence of the condition may be detected or otherwise determined by the monitoring component. In some instances, the monitoring component may determine the presence of the condition based at least in part on the data associated with the vehicle operating in the environment.

In some examples, the condition necessitating that the vehicle pull over may be a condition associated with a component or system of the vehicle, an occupant of the vehicle, an environmental condition, an emergency condition, and/or the like. For instance, the condition may be a fault associated with a component or system of the vehicle, such as a fault associated with a sensor of the vehicle, a perception system of the vehicle, a prediction system of the vehicle, components of the vehicle (e.g., wheels, tires, lights, electronics, doors, windows, etc.), or the like. As another example, the condition may be associated with an occupant of the vehicle, such as a medical condition of the occupant (e.g., seizure, fainting, injury, sickness, etc.), the occupant requesting to exit the vehicle, or the like. Additionally, the condition may be an environmental condition (e.g., snow, ice, rain, sleet, hail, intense heat, wind, flooding, etc.) making vehicle operation unsafe. Further, the condition may be an emergency condition, such as a medical emergency of a pedestrian proximate the vehicle.

In some examples, the techniques may include determining whether the condition necessitates that the vehicle stop or pull over immediately, or if the vehicle can continue to operate under certain constraint(s). For instance, the monitoring component of the vehicle may determine whether the vehicle may continue operating or, instead, pull over. In some examples, whether the vehicle can continue operating may be determined based on a type of the condition (e.g., whether the condition is a fault of a system or component, a weather condition, a pedestrian condition, and emergency condition, etc.). For instance, if the condition is a fault associated with a component or system of the vehicle that renders the vehicle in a technically degraded state but still fully functional, then the vehicle may be able to continue operating for a certain period of time. Additionally, or alternatively, whether the vehicle can continue operating may be determined based at least in part on a cost associated with the condition. In some instances, the cost may be determined based on one or more of the type of the condition, a significance of the condition (e.g., how severe the condition is), a remedy for the condition (e.g., how long or difficult to fix the condition), and/or the like. As an example, the cost may be a number between 0 and 1, and the magnitude of that number may be calculated based on one or more of the significance of the condition, the type of the condition, the remedy of the condition, or the like.

If a determination is made that the vehicle can continue operating (e.g., that an immediate stop is not required), then one or more constraint(s) may be determined for operating the vehicle. In some examples, the one or more constraint(s) may be determined by the monitoring component. Additionally, in some instances, the one or more constraint(s) may be determined based at least in part on the condition, including based on a type of the condition, a cost associated with the condition, or the like.

In some examples, the one or more constraint(s) may include a period of time (e.g., minutes, hours, days, weeks, months, etc.) that the vehicle can continue operating. That is, the vehicle may be required, by the constraint, to pull over or otherwise cease from operating on the road surface prior to an expiration of the period of time. In some examples, a length of the period of time may be determined based on the condition and/or the magnitude of the cost associated with the condition. For instance, conditions that are more severe may be given a shorter period of time and conditions that are less severe may be given a longer period of time. In some examples, combinations of different conditions may cause the period of time to be shortened. For instance, if a period of time was determined at a first time for a first condition and then a second condition is detected, the period of time may be shortened, in some examples.

In some instances, time-related constraints help manage operational time before the vehicle actually enters a park or a stationary condition. As such, the monitoring component may perform an analysis to determine a proper length of the period of time to avoid causing a potential adverse event. Additionally, enforcing the time-related constraint by bringing the vehicle to a stop at an expiration of the period of time (if the planner or teleoperator do not bring the vehicle to a stop sooner) helps ensure that the vehicle will in fact be brought to a stop if the connection is severed, if the constraint is violated, or if some other error takes place.

In some examples, the one or more constraint(s) may also include operational constraints (e.g., maximum velocity, maximum acceleration rates, maximum deceleration rates or maximum brake force, maximum turning angle, or the like), environmental constraints (e.g., only operate during daylight hours, only operate if weather is clear, etc.), traffic-related constraints (e.g., only operate during low traffic congestion periods), and/or the like.

In some examples, the techniques may include sending an indication or request that the vehicle pull over or otherwise cease from operating on the road surface. For instance, the monitoring component may send this request or indication to at least one of a teleoperator associated with the vehicle or a planner component of the vehicle. The planner component may be component that is responsible for planning a trajectory for the vehicle to follow in the environment, and additional detail about the planner component is further described below.

In some examples, subsequent to sending the request or indication that the vehicle is to pull over, an indication may be received indicating that the teleoperator or the planner component acknowledged the request or initiated a process of pulling the vehicle over. For instance, the teleoperator or the planner component may require some time to determine an optimal location and time to pull the vehicle over, and the indication may simply indicate that one of those entities began processing the request. In some examples, an additional period of time may be allocated based on the indication that the teleoperator or the planner component acknowledge the request. That is, the period of time may be extended to allow the planner component or the teleoperator to decide an optimal stopping location. For instance, the monitoring component may receive a heartbeat signal while the planner component and/or the teleoperator is in the process of pulling the vehicle over, and while the monitoring component is receiving the heartbeat signal it may suspend or otherwise refrain from initiating a stop or pull over of the vehicle at its current location. The heartbeat signal can indicate that the planner component and/or teleoperator is acting on the request to initiate a pull over (e.g., that a teleoperator is being selected to guide the vehicle to a pulled over state or that the planner component has queued the pull-over operation). In some examples, the period of time for the vehicle to pull over may be dynamic in that it may be extended or shortened based on the condition, whether the vehicle is operating within a constraint, or the like. For example, the period of time may be extended if it is determined that a planner component is processing many requests (e.g., that the compute resources are operating at high duty cycle, the thermal output or power load is high, or that an outstanding queue of actions to be performed is high) or that a teleoperator facility is under high load (e.g., that an outstanding queue is high, a time to operator response metric is high, etc.).

Additionally, in some examples, the techniques may include refraining from causing the vehicle to stop on the road surface such that the vehicle impedes the flow of traffic based at least in part on receiving the indication prior to the expiration of the period of time. That is, because the teleoperator or the planner component acknowledged the request, the system or the monitoring component may refrain from stopping the vehicle in a traffic lane or in another non-optimal location.

In some examples, subsequent to sending the request/indication that the vehicle is to pull over, the monitoring component may continue to monitor whether the vehicle has ceased from operating on the road surface in accordance with the constraint, regardless of whether the planner component or the teleoperator acknowledge the request/indication. In this way, if the monitoring component may be able to make a determination of whether the vehicle has continued operating on the road surface in violation of the constraint. In examples, if the monitoring component determines that the vehicle has continued operating on the road surface in violation of the constraint, then the monitoring component may cause the vehicle to initiate a stop on the road surface, possibly in a non-optimal location (e.g., in a traffic lane, on a narrow road shoulder, on a busy street, etc.).

In some examples, when a condition is detected and it is determined that the vehicle can continue operating but that the vehicle does need to be pulled over at some future point in time to remedy the condition, the request/indication for the vehicle to pull over may be sent to the planner component of the vehicle, at least initially. In such example, if the planner component isn't fully capable of determining an optimal pullover location, a determination may be made to invoke the teleoperator. As such, the request/indication may be forwarded to the teleoperator for them to decide the optimal pullover location, an optimal time to stop the vehicle at the location, and/or a route to get there. However, the planner component may be given the first opportunity to determine the optimal pullover location and associated information, and this may limit the number of times that the teleoperator is invoked to help decide the pullover location.

In some instances, the vehicle may include a pull over location component that actively determines optimal pull over locations for the vehicle, as well as for one or more vehicles of a fleet of vehicles. For instance, a high-definition semantic map may be encoded with locations in an environment that are optimal for vehicles to pull over at if the vehicle is experiencing an adverse condition, as described herein. In such scenarios, these locations may be shared with multiple vehicles of a vehicle fleet so that all of the vehicle's consistently pull over at designated locations, if they are required to do so. In such examples, however, the vehicles may still need to determine whether it is safe to pull over at those locations. For instance, if another vehicle, pedestrian, etc. is in the way, the vehicle would need to pull over or stop at a different location.

The technologies described herein improve the functioning of vehicles in several ways. As one example, the disclosed techniques enable a vehicle to take advantage of redundant components and/or systems to operate longer and still maintain safety requirements. For instance, many modern vehicles include redundant (e.g., backup) components or systems that take over when a main component or system is not functioning properly. When these redundant components/systems take over for a faulted component/system, the vehicle can still safely operate but is considered to be in a more compromised state due to not having a redundant backup for that component/system. The techniques of this disclosure make it safer for vehicles to continue operating when these conditions occur.

Furthermore, the techniques described herein can help minimize traffic congestions. For instance, when an autonomous vehicle detects that one of its systems or components has failed, the autonomous vehicle may be configured to come to a stop. When this occurs, however, the autonomous vehicle may have tendencies to stop in locations that impede the flow of traffic, such as stopping in a traffic lane or pulling over to the road shoulder in an area where other vehicles will have to change their behavior (e.g., speed, trajectory, etc.) out of precaution. The disclosed techniques allow for the autonomous vehicle to make a quick decision about whether it can continue to operate, and then choose a more optimal location to stop for assessing/remedying the problem.

These and other aspects of the disclosed technologies are described further below with reference to the accompanying drawings. The drawings are merely example implementations and should not be construed to limit the scope of the claims. For example, while the example vehicles are shown and described as being autonomous vehicles that are capable of navigating between locations without human control or intervention, techniques described herein are also applicable to non-autonomous and/or semi-autonomous vehicles. Also, while the vehicle is illustrated as having a coach style body module with seats facing one another toward a center of the vehicle, other body modules are contemplated. Body modules configured to accommodate any number of one or more occupants (e.g., 1, 2, 3, 4, 5, 6, 7, 8, etc.) are contemplated. Additionally, while the example body modules shown include a passenger compartment, in other examples the body module may not have a passenger compartment (e.g., in the case of a cargo vehicle, delivery vehicle, construction vehicle, etc.).

FIG. 1 is a pictorial flow diagram illustrating an example process 100 associated with the technologies disclosed herein for intelligent vehicle pull over. In examples, the vehicle 102 may include one or more components or systems that enable the vehicle 102 to traverse the environment 104. For instance, the vehicle 102 may include one or more sensor(s) that generate sensor data associated with the environment 104. For example, the vehicle may include audio sensors (e.g., microphones), image sensors (e.g., cameras), lidar sensors, radar sensors, ultrasonic transducers, sonar sensors, location sensors (e.g., global positioning component (GPS), compass, etc.), inertial sensors (e.g., inertial measurement units, accelerometers, magnetometers, gyroscopes, etc.), wheel encoders, environmental sensors (e.g., temperature sensors, humidity sensors, light sensors, pressure sensors, smoke sensors, etc.), time of flight (ToF) sensors, etc. In examples, the type(s) of sensor data generated by the sensor(s) may include audio data, image data, lidar data, radar data, ultrasonic transducer data, sonar data, location data (e.g., global positioning component (GPS), compass, etc.), pose data, inertial data (e.g., inertial measurement units data, accelerometer data, magnetometer data, gyroscope data, etc.), wheel encoder data, environmental data (e.g., temperature sensor data, humidity sensor data, light sensor data, pressure sensor data, smoke sensor data, etc.), ToF sensor data, etc.

In some examples, the vehicle 102 may include systems or components for the vehicle 102 to autonomously, or semi-autonomously, navigate through the environment. For instance, the vehicle 102 may include a perception system for detecting and classifying objects 106 in the environment 104. Additionally, the vehicle 102 may include a prediction system for prediction motion of the object 106, including trajectories of the objects 106. The vehicle 102 may also include a mapping system. In some examples, the mapping system, the perception system, and/or other systems of the vehicle 102 may work together to identify drivable surfaces and regions of the environment 104, such as being able to differentiate between a traffic lane 108 and a non-traffic lane 110 (e.g., a parking area, sidewalk, etc.) Additionally, in examples, the vehicle 102 includes a planner component 112 that is capable of determining a trajectory 114 for the vehicle 102 to follow in the environment 104.

In some examples, the vehicle 102 may also include a monitoring component 116. In examples, the monitoring component 116 may be a centralized component of the vehicle 102 that all other components or systems of the vehicle 102 report their faults and/or diagnostics to, and the monitoring component 116 can then decide what to do about those faults. That is, the monitoring component 116 may have visibility of everything going on in the vehicle 102 and be able to decide what is an appropriately conservative course of action to do based on a fault or diagnostic. Additionally, the monitoring component 116 may, in some instances, provide a set of constraint(s) to the systems or components of the vehicle 102, such as the planner component 112. For example, a constraint may be a maximum allowed speed range that the planner component 112 should be operating within. Additionally, if the monitoring component 116 detects a diagnostic that requires a reduction in this maximum speed range the monitoring component 116 would then update the maximum speed range to be a lower range and then the planner component 112 may take that maximum speed range and use it to plan trajectories, determine proper routes, etc. In other words, outputs of the monitoring component 116 may be used to bound other systems and/or components of the vehicle 102 and then allow those systems/components to reconfigure their behavior within a different operating envelope.

In examples, the vehicle 102 may be able to communicate with one or more teleoperator device(s) 118 over one or more networks 120. In some instances, one or more human teleoperators associated with the teleoperator device(s) 118 may monitor the vehicle 102 in addition to one or more other vehicles that are part of a fleet of vehicles.

In some examples, the vehicle 102 may be operating in the environment 104 and the monitoring component 116 may, at operation 122 (e.g., at time $T_0$), detect a presence of a condition that necessitates that the vehicle pull over or otherwise cease from operating in the traffic lane 108 of the environment 104. For instance, the monitoring component 116 may detect the presence of the condition based at least in part on data associated with the vehicle 102 operating in the environment 104. In some examples, the data may be health-related data associated with components or systems of the vehicle (e.g., data indicating whether any components or systems of the vehicle are in a faulted or abnormal state), environmental data (e.g., weather-related data), traffic-related data (e.g., event data), occupant related data (e.g., data associated with occupants of the vehicle), or the like. In some examples, the condition necessitating that the vehicle 102 pull over may be a condition associated with a component or system of the vehicle, an occupant of the vehicle, an environmental condition, an emergency condition, and/or the like. For instance, the condition may be a fault associated with a component or system of the vehicle, such as a fault associated with a sensor of the vehicle, a perception system of the vehicle, a prediction system of the vehicle, components of the vehicle (e.g., wheels, tires, lights, electronics, doors, windows, etc.), the planner component 112, a network 120 communication error with the teleoperator device (s) 118, or the like. As another example, the condition may be associated with an occupant of the vehicle 102, such as a medical condition of the occupant (e.g., seizure, fainting, injury, sickness, etc.), the occupant requesting to exit the vehicle 102, or the like. Additionally, the condition may be an environmental condition (e.g., snow, ice, rain, sleet, hail, intense heat, wind, flooding, etc.) making vehicle operation unsafe. Further, the condition may be an emergency condition, such as a medical emergency of a pedestrian proximate the vehicle.

In some examples, the monitoring component 116 may further determine whether the detected condition necessitates that the vehicle 102 initiate an immediate stop or if the vehicle 102 can continue to operate. In some examples, whether the vehicle 102 can continue operating may be determined by the monitoring component 116 based on a type of the condition (e.g., whether the condition is a fault of a system or component, a weather condition, a pedestrian condition, and emergency condition, etc.). For instance, if the condition is a fault associated with a component or system of the vehicle 102 that renders the vehicle 102 in a technically degraded state but still fully functional, then the monitoring component 116 may determine that the vehicle 102 can continue operating for a certain period of time. Additionally, or alternatively, whether the vehicle 102 can continue operating may be determined based at least in part on a cost associated with the condition. In some instances, the cost may be determined based on one or more of the type of the condition, a significance of the condition (e.g., how severe the condition is), a remedy for the condition (e.g., how long or difficult to fix the condition), and/or the like. As an example, the cost may be a number between 0 and 1, and the magnitude of that number may be calculated based on one or more of the significance of the condition, the type of the condition, the remedy of the condition, or the like.

At operation 124, if the monitoring component 116 makes the determination that the vehicle 102 can continue operating (e.g., that an immediate stop is not required), then one or more constraint(s) may be determined for operating the vehicle 102. In some examples, the one or more constraint(s) may be determined by the monitoring component 116 based at least in part on the condition, including based on a type of the condition, a cost associated with the condition, or the like.

In some examples, the one or more constraint(s) may include a period of time (e.g., minutes, hours, days, weeks, months, etc.) that the vehicle 102 can continue operating. That is, the vehicle 102 may be required, by the constraint, to pull over (e.g., into the non-traffic lane 110) or otherwise cease from operating in the traffic lane 108 prior to an expiration of the period of time. In some examples, a length of the period of time may be determined by the monitoring component 116 based on the condition and/or the magnitude of the cost associated with the condition. For instance, conditions that are more severe may be given a shorter period of time and conditions that are less severe may be given a longer period of time. In some examples, combinations of different conditions may cause the period of time to be shortened. For instance, if a period of time was determined at a first time for a first condition and then a second condition is detected, the period of time may be shortened, in some examples.

In some examples, the length of the period of time may be determined and/or changed dynamically based on a push and/or pull system that actively monitors or waits until a component reports a fault and/or a time that the component will be operational. Additionally, or alternatively, a machine-learned model (e.g., a trained network) may determine the length of the period of time. The machine-learned model may be trained based on known fault reporting and/or how long the vehicle could operate under certain conditions or faults. In examples, the machine-learned model could take into account they types and/or number of faults being reported, temperatures or voltages of vehicle batteries, environmental conditions, the age of the vehicle, etc. Additionally, in some instances a tiered list or a hierarchy may be used for determining the length of the period of time. For instance, this list may be configured such that certain faults may be prescribed a specific time, and if multiple faults are present the constraint(s) may be elevated into a higher tier and the period of time may be shortened.

In examples, the one or more constraint(s) may also include operational constraints (e.g., maximum velocity, maximum acceleration rates, maximum deceleration rates or maximum brake force, maximum turning angle, or the like), environmental constraints (e.g., only operate during daylight hours, only operate if weather is clear, etc.), traffic-related constraints (e.g., only operate during low traffic congestion periods), and/or the like.

At operation 126, the monitoring component 116 may send a pullover request to at least one of the planner component 112 and/or the teleoperator device(s) 118. The pullover request may indicate that the vehicle 102 needs to pull over or otherwise cease from operating in the traffic lane 108. In some examples, the monitoring component 116 may initially send the pullover request to the planner component 112 of the vehicle 102, instead of the teleoperator device(s) 118. In such examples, if the planner component 112 isn't fully capable of determining an optimal pullover location, a determination may be made to invoke the teleoperator device(s) 118. As such, the pullover request may be forwarded to the teleoperator device(s) 118, from either the planner component 112 or the monitoring component 116, for the teleoperator to decide the optimal pullover location, an optimal time to stop the vehicle 102 at the location, and/or a route to get there. However, in some examples, the planner component 112 may be given the first opportunity to determine the optimal pullover location and associated information, and this may limit the number of times that the teleoperator device(s) 118 are invoked to help decide the pullover location.

At operation 128, the planner component 112 and/or the teleoperator device(s) 118 may initiate pulling over the vehicle 102. In some instances, the monitoring component 116 may receive an indication that the planner component 112 and/or the teleoperator device(s) 118 acknowledge the request and/or are actively determining where and when to stop the vehicle 102 in a non-traffic lane 110. In some examples, an additional period of time may be allocated based on the indication that the teleoperator device(s) 118 and/or the planner component 112 acknowledged the request. That is, if a period of time constraint is active, the period of time may be extended to allow the planner component 112 or the teleoperator device(s) 118 to decide an optimal stopping location for the vehicle 102.

At operation 130, the monitoring component 116 may monitor the pullover response of the vehicle 102. In some examples, subsequent to sending the request/indication that the vehicle 102 is to pull over, the monitoring component 116 may continue to monitor whether the vehicle 102 has ceased from operating on the road surface in accordance with the constraint, regardless of whether the planner component 112 or the teleoperator device(s) 118 acknowledge the request/indication. In this way, the monitoring component 116 may be able to make a determination of whether the vehicle 102 has violated the constraint and/or if the vehicle has pulled over in accordance with the constraint. In examples, if the monitoring component 116 determines that the vehicle 102 has continued operating on the road surface in violation of the constraint, then the monitoring component 116 may cause the vehicle 102 to initiate a stop on the road surface in a non-optimal location (e.g., in a traffic lane 108, on a narrow road shoulder, on a busy street, etc.).

At operation 132, if the monitoring component 116 determines that the vehicle 102 is operating in accordance with the constraint(s), if it determines that the vehicle 102 has pulled over, of if it determines that the condition has subsided or been remedied, the monitoring component 116 may refrain from initiating a stop-in-lane procedure (e.g., stopping the vehicle in a non-optimal location). That is, in some examples, the monitoring component 116 may refrain from causing the vehicle 102 to stop on the road surface such that the vehicle 102 impedes the flow of traffic. In this way, the vehicle may continue to operate before stopping in a more optimal location at a more optimal time (e.g., $T_{O+N}$).

FIGS. 2-5 are data flow diagrams illustrating various example processes associated with the techniques described herein. The processes 200, 300, 400, and 500 illustrated in FIGS. 2-5 are illustrated as collections of blocks in control flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the processes may be omitted entirely. Moreover, the processes may be combined in whole or in part with other methods.

Figure 2:
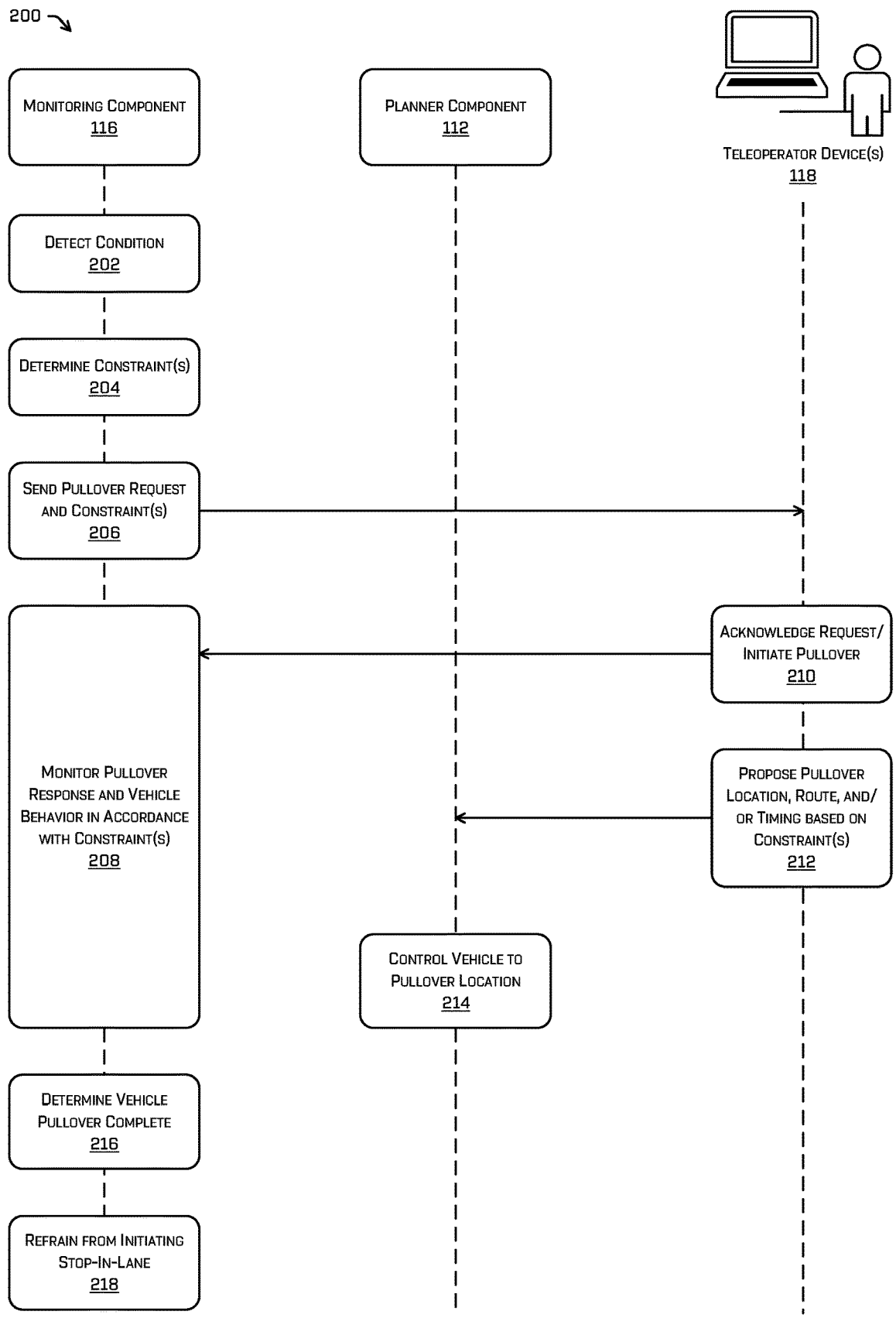
FIG. 2 is a data flow diagram illustrating an example process associated with the techniques described herein in which a teleoperator is invoked for pulling over the vehicle.

FIG. 2 is a data flow diagram illustrating an example process 200 associated with the techniques described herein in which a teleoperator is invoked for pulling over the vehicle. The process 200 begins at operation 202, which includes detecting, by the monitoring component 116, a presence of a condition necessitating that the vehicle pull over or otherwise cease from operating on a drivable portion (e.g., traffic lane) of a road surface in an environment. In some examples, the condition necessitating that the vehicle pull over may be a condition associated with a component or system of the vehicle, an occupant of the vehicle, an environmental condition, an emergency condition, and/or the like. For instance, the condition may be a fault associated with a component or system of the vehicle, such as a fault associated with a sensor of the vehicle, a perception system of the vehicle, a prediction system of the vehicle, components of the vehicle (e.g., wheels, tires, lights, electronics, doors, windows, etc.), the planner component 112, a network communication error with the teleoperator device(s) 118, or the like. As another example, the condition may be associated with an occupant of the vehicle, such as a medical condition of the occupant (e.g., seizure, fainting, injury, sickness, etc.), the occupant requesting to exit the vehicle, or the like. Additionally, the condition may be an environmental condition (e.g., snow, ice, rain, sleet, hail, intense heat, wind, flooding, etc.) making vehicle operation unsafe. Further, the condition may be an emergency condition, such as a medical emergency of a pedestrian proximate the vehicle.

At operation 204, the monitoring component 116 may determine one or more constraint(s) for operating the vehicle while the condition is present. In some examples, the one or more constraint(s) may be determined by the monitoring component 116 based at least in part on the condition, including based on a type of the condition, a cost associated with the condition, or the like. In some examples, the one or more constraint(s) may include a period of time (e.g., minutes, hours, days, weeks, months, etc.) that the vehicle can continue operating. That is, the vehicle may be required, by the constraint, to pull over (e.g., into a non-traffic lane) or otherwise cease from operating in a traffic lane prior to an expiration of the period of time. In some examples, a length of the period of time may be determined by the monitoring component 116 based on the condition and/or the magnitude of the cost associated with the condition. For instance, conditions that are more severe may be given a shorter period of time and conditions that are less severe may be given a longer period of time. In some examples, combinations of different conditions may cause the period of time to be shortened. For instance, if a period of time was determined at a first time for a first condition and then a second condition is detected, the period of time may be shortened, in some examples. In examples, the one or more constraint(s) may also include operational constraints (e.g., maximum velocity, maximum acceleration rates, maximum deceleration rates or maximum brake force, maximum turning angle, or the like), environmental constraints (e.g., only operate during daylight hours, only operate if weather is clear, etc.), traffic-related constraints (e.g., only operate during low traffic congestion periods), and/or the like. In some examples, certain conditions may bring about multiple different constraints. For instance, if the condition is that the brakes of the vehicle need repair or maintenance, then the constraints may be a period of time, a maximum speed of the vehicle (e.g., do not exceed speed), a maximum braking pressure or deceleration rate, an increased following distance, an earlier stopping distance, and/or the like.

At operation 206, the monitoring component 116 may send a pullover request including the one or more constraint(s) to the teleoperator device(s) 118. For instance, the pullover request and constraint(s) may indicate that the vehicle needs to be pulled over before an expiration of a period of time. At operation 208, the monitoring component 116 may monitor the pullover response and the vehicle behavior in accordance with the constraint(s). In other words, the monitoring component 116 may monitor whether the teleoperator device(s) 118 are responding to the request, as well as whether the vehicle is going to pull over in accordance with the constraint(s).

At operation 210, the teleoperator device(s) 118 may acknowledge the request and initiate pulling the vehicle over. That is, the teleoperator device(s) may initiate selecting an optimal stopping location for the vehicle based on the required constraint(s). In some instances, an indication may be sent to the monitoring component 116 indicating that the teleoperator device(s) 118 have acknowledged the request and/or initiated the pull over of the vehicle. In some examples, additional or alternative signals may be sent as well, such as an indication that more time is needed, an indication that a teleoperator cannot be reached (e.g., line is busy), or the like.

At operation 212, the teleoperator device(s) 118 may send a proposed pull over location, route, and/or timing, based on the constraint(s), to the planner component 112. For instance, the teleoperator device(s) may provide a destination location for the vehicle to pull over at, a time when the vehicle is to begin heading to that location, and/or a route to get to the location such that the constraint(s) are not violated. For instance, if the constraint requires that the vehicle is to not exceed 45 MPH, then the teleoperator device(s) 118 may provide a route to get to the location that does not include freeways, highways, or other roads where the speed limit is greater than 45 MPH. At operation 214, the planner component 112 may control the vehicle to the pull over location. For instance, if the planner component 112 receives a destination pull over location from the teleoperator device(s) 118, the planner component 112 may determine a route to get to the destination.

At operation 216, the monitoring component 116 may determine that the vehicle pull over is complete and that the vehicle pulled over in accordance with the constraint(s). As such, at operation 218, the monitoring component 116 may refrain from initiating a stop-in-lane that may impede the flow of traffic.

Figure 3:
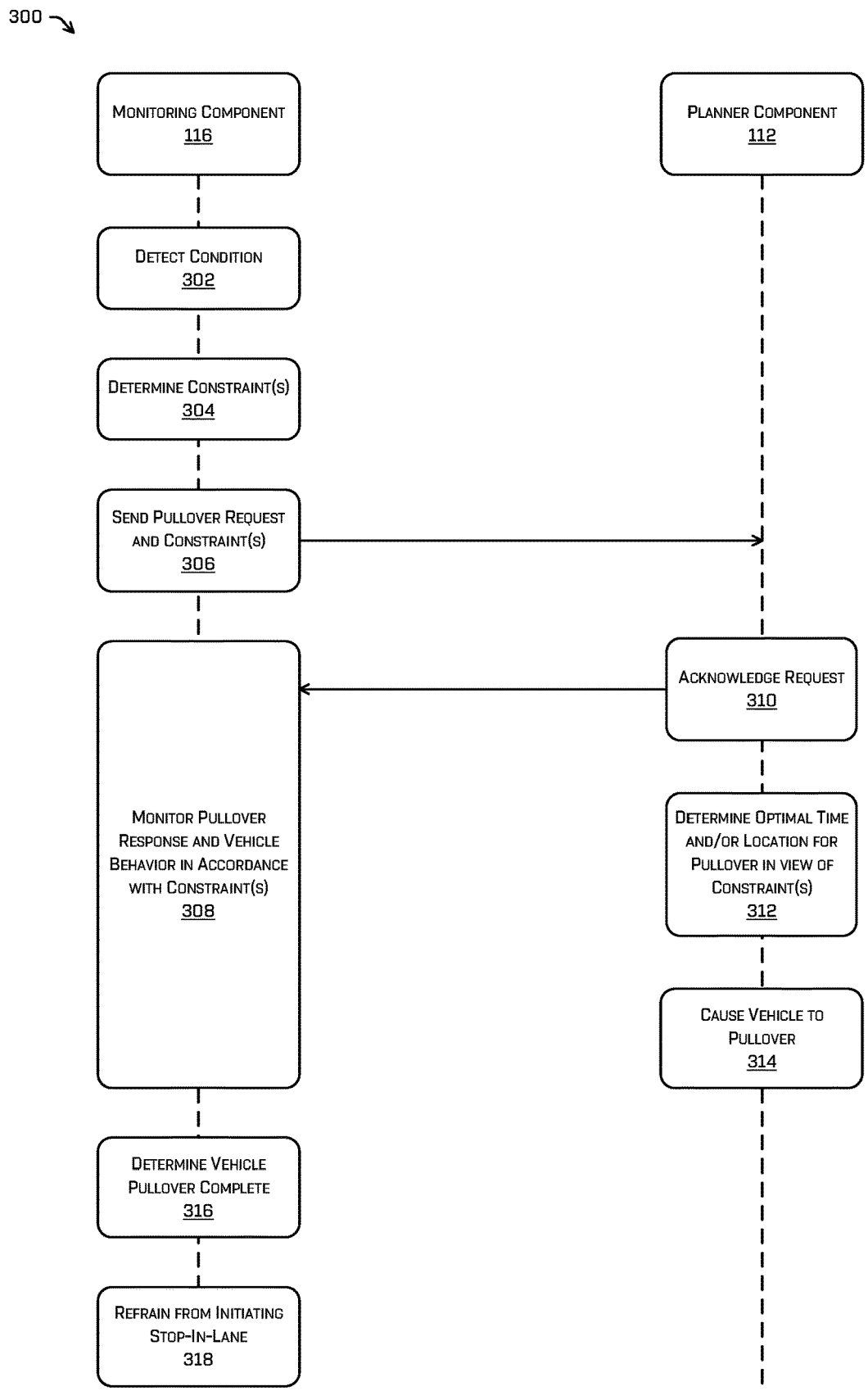
FIG. 3 is a data flow diagram illustrating another example process associated with the techniques described herein in which a planner component of the vehicle handles pulling the vehicle over.

FIG. 3 is a data flow diagram illustrating another example process 300 associated with the techniques described herein in which a planner component 112 of the vehicle handles pulling the vehicle over. The process 300 begins at operation 302, which includes detecting, by the monitoring component 116, a presence of a condition necessitating that the vehicle pull over or otherwise cease from operating on a drivable portion (e.g., traffic lane) of a road surface in an environment. In some examples, the condition necessitating that the vehicle pull over may be a condition associated with a component or system of the vehicle, an occupant of the vehicle, an environmental condition, an emergency condition, and/or the like. For instance, the condition may be a fault associated with a component or system of the vehicle, such as a fault associated with a sensor of the vehicle, a perception system of the vehicle, a prediction system of the vehicle, components of the vehicle (e.g., wheels, tires, lights, electronics, doors, windows, etc.), the planner component 112, a network communication error with a teleoperator, or the like. As another example, the condition may be associated with an occupant of the vehicle, such as a medical condition of the occupant (e.g., seizure, fainting, injury, sickness, etc.), the occupant requesting to exit the vehicle, or the like. Additionally, the condition may be an environmental condition (e.g., snow, ice, rain, sleet, hail, intense heat, wind, flooding, etc.) making vehicle operation unsafe. Further, the condition may be an emergency condition, such as a medical emergency of a pedestrian proximate the vehicle.

At operation 304, the monitoring component 116 may determine one or more constraint(s) for operating the vehicle while the condition is present. In some examples, the one or more constraint(s) may be determined by the monitoring component 116 based at least in part on the condition, including based on a type of the condition, a cost associated with the condition, or the like. In some examples, the one or more constraint(s) may include a period of time (e.g., minutes, hours, days, weeks, months, etc.) that the vehicle can continue operating. That is, the vehicle may be required, by the constraint, to pull over (e.g., into a non-traffic lane) or otherwise cease from operating in a traffic lane prior to an expiration of the period of time. In some examples, a length of the period of time may be determined by the monitoring component 116 based on the condition and/or the magnitude of the cost associated with the condition. For instance, conditions that are more severe may be given a shorter period of time and conditions that are less severe may be given a longer period of time. In some examples, combinations of different conditions may cause the period of time to be shortened. For instance, if a period of time was determined at a first time for a first condition and then a second condition is detected, the period of time may be shortened, in some examples. In examples, the one or more constraint(s) may also include operational constraints (e.g., maximum velocity, maximum acceleration rates, maximum deceleration rates or maximum brake force, maximum turning angle, or the like), environmental constraints (e.g., only operate during daylight hours, only operate if weather is clear, etc.), traffic-related constraints (e.g., only operate during low traffic congestion periods), and/or the like.

At operation 306, the monitoring component 116 may send a pullover request including the one or more constraint(s) to the planner component 112. For instance, the pullover request and constraint(s) may indicate that the vehicle needs to be pulled over before an expiration of a period of time. At operation 308, the monitoring component 116 may monitor the pullover response and the vehicle behavior in accordance with the constraint(s). In other words, the monitoring component 116 may monitor whether the planner component 112 is responding to the request, as well as whether the vehicle is going to pull over in accordance with the constraint(s).

At operation 310, the planner component 112 may acknowledge the request, and an indication of this acknowledgement may be sent to the monitoring component 116. At operation 312, the planner component 112 may determine an optimal time and/or location for pulling the vehicle over in view of the constraint(s). For example, if one of the constraint(s) requires that the vehicle be pulled over within 10 minutes, and the vehicle will reach its original destination within 2 minutes, then the planner component 112 may refrain from causing the vehicle to pull over until after it reaches its original destination. At operation 314, the planner component 112 may cause the vehicle to pull over at the optimal location.

At operation 316, the monitoring component 116 may determine that the vehicle pull over is complete and that the vehicle pulled over in accordance with the constraint(s). As such, at operation 318, the monitoring component 116 may refrain from initiating a stop-in-lane that may impede the flow of traffic.

Figure 4:
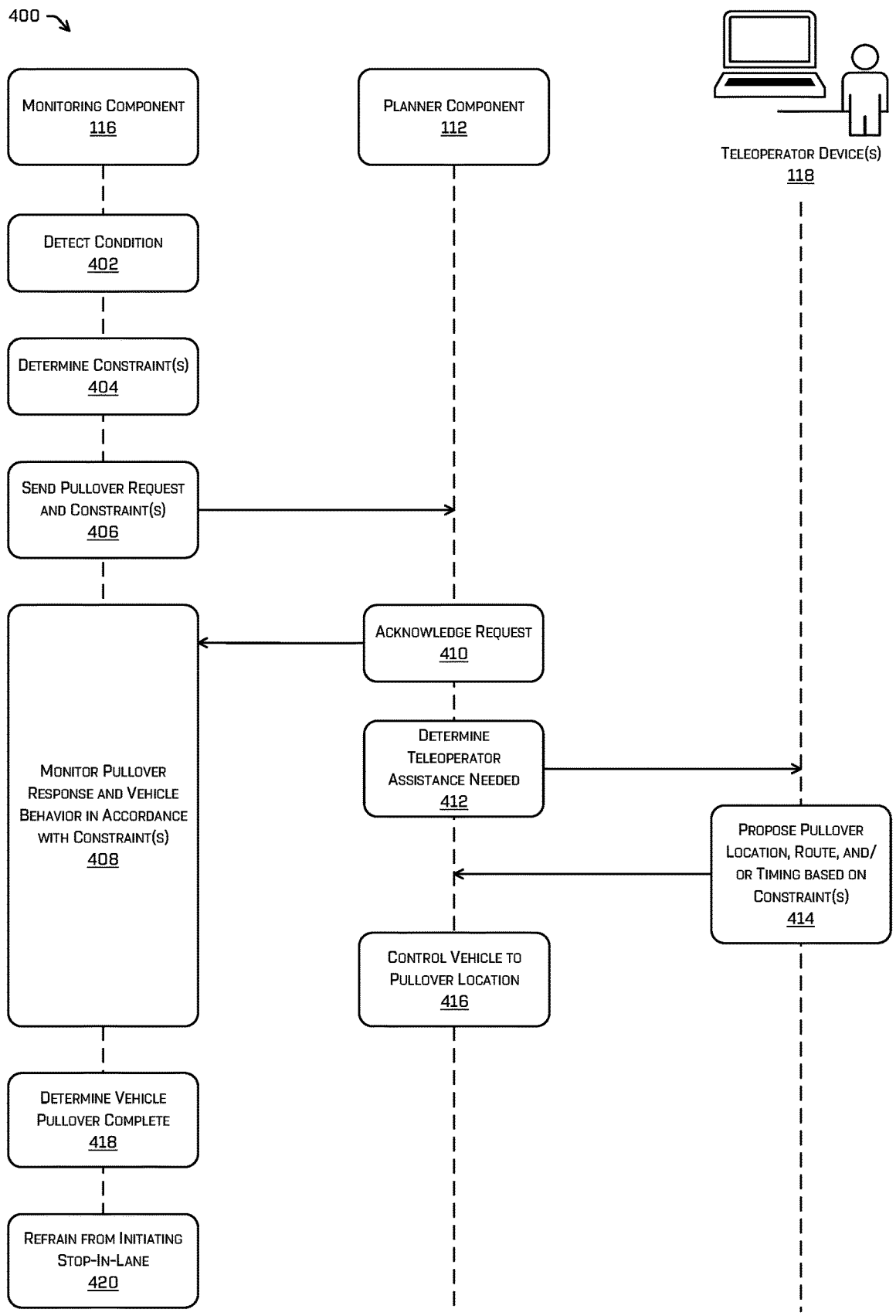
FIG. 4 is a data flow diagram illustrating yet another example process associated with the techniques described herein in which the planner component determines to invoke the teleoperator to pull the vehicle over.

FIG. 4 is a data flow diagram illustrating yet another example process 400 associated with the techniques described herein in which the planner component determines to invoke the teleoperator to pull the vehicle over. The process 400 begins at operation 402, which includes detecting, by the monitoring component 116, a presence of a condition necessitating that the vehicle pull over or otherwise cease from operating on a drivable portion (e.g., traffic lane) of a road surface in an environment. In some examples, the condition necessitating that the vehicle pull over may be a condition associated with a component or system of the vehicle, an occupant of the vehicle, an environmental condition, an emergency condition, and/or the like. For instance, the condition may be a fault associated with a component or system of the vehicle, such as a fault associated with a sensor of the vehicle, a perception system of the vehicle, a prediction system of the vehicle, components of the vehicle (e.g., wheels, tires, lights, electronics, doors, windows, etc.), the planner component 112, a network communication error with the teleoperator device(s) 118, or the like. As another example, the condition may be associated with an occupant of the vehicle, such as a medical condition of the occupant (e.g., seizure, fainting, injury, sickness, etc.), the occupant requesting to exit the vehicle, or the like. Additionally, the condition may be an environmental condition (e.g., snow, ice, rain, sleet, hail, intense heat, wind, flooding, etc.) making vehicle operation unsafe. Further, the condition may be an emergency condition, such as a medical emergency of a pedestrian proximate the vehicle.

At operation 404, the monitoring component 116 may determine one or more constraint(s) for operating the vehicle while the condition is present. In some examples, the one or more constraint(s) may be determined by the monitoring component 116 based at least in part on the condition, including based on a type of the condition, a cost associated with the condition, or the like. In some examples, the one or more constraint(s) May include a period of time (e.g., minutes, hours, days, weeks, months, etc.) that the vehicle can continue operating. That is, the vehicle may be required, by the constraint, to pull over (e.g., into a non-traffic lane) or otherwise cease from operating in a traffic lane prior to an expiration of the period of time. In some examples, a length of the period of time may be determined by the monitoring component 116 based on the condition and/or the magnitude of the cost associated with the condition. For instance, conditions that are more severe may be given a shorter period of time and conditions that are less severe may be given a longer period of time. In some examples, combinations of different conditions may cause the period of time to be shortened. For instance, if a period of time was determined at a first time for a first condition and then a second condition is detected, the period of time may be shortened, in some examples. In examples, the one or more constraint(s) may also include operational constraints (e.g., maximum velocity, maximum acceleration rates, maximum deceleration rates or maximum brake force, maximum turning angle, or the like), environmental constraints (e.g., only operate during daylight hours, only operate if weather is clear, etc.), traffic-related constraints (e.g., only operate during low traffic congestion periods), and/or the like.

At operation 406, the monitoring component 116 may send a pullover request including the one or more constraint(s) to the planner component 112. For instance, the pullover request and constraint(s) may indicate that the vehicle needs to be pulled over before an expiration of a period of time. At operation 408, the monitoring component 116 may monitor the pullover response and the vehicle behavior in accordance with the constraint(s). In other words, the monitoring component 116 may monitor whether the planner component 112 is responding to the request, as well as whether the vehicle is going to pull over in accordance with the constraint(s).

At operation 410, the planner component 112 may acknowledge the request, and an indication of this acknowledgement may be sent to the monitoring component 116. At operation 412, the planner component 112 may determine that teleoperator assistance is needed. For instance, the planner component 112 may not be capable of providing an optimal pull over location, time, etc., and the planner component 112 may determine to invoke a human teleoperator for assistance. As such, the planner component 112 may invoke a teleoperator by, for instance, forwarding the request and constraint(s) to the teleoperator device(s) 118.

At operation 414, the teleoperator device(s) 118 may propose an optimal pullover location, route, and/or timing based on the constraint(s). For instance, the teleoperator may take into consideration various factors when determining the optimal pullover location, including the constraints and other knowledge about the environment, the vehicle, or the like. In some examples, the teleoperator device(s) 118 may provide the location, a route, and/or timing for the stop to the planner component 112. At operation 416, the planner component 112 may control the vehicle to pull over at the optimal location proposed by the teleoperator.

At operation 418, the monitoring component 116 may determine that the vehicle pull over is complete and that the vehicle pulled over in accordance with the constraint(s). As such, at operation 420, the monitoring component 116 may refrain from initiating a stop-in-lane that may impede the flow of traffic.

Figure 5:
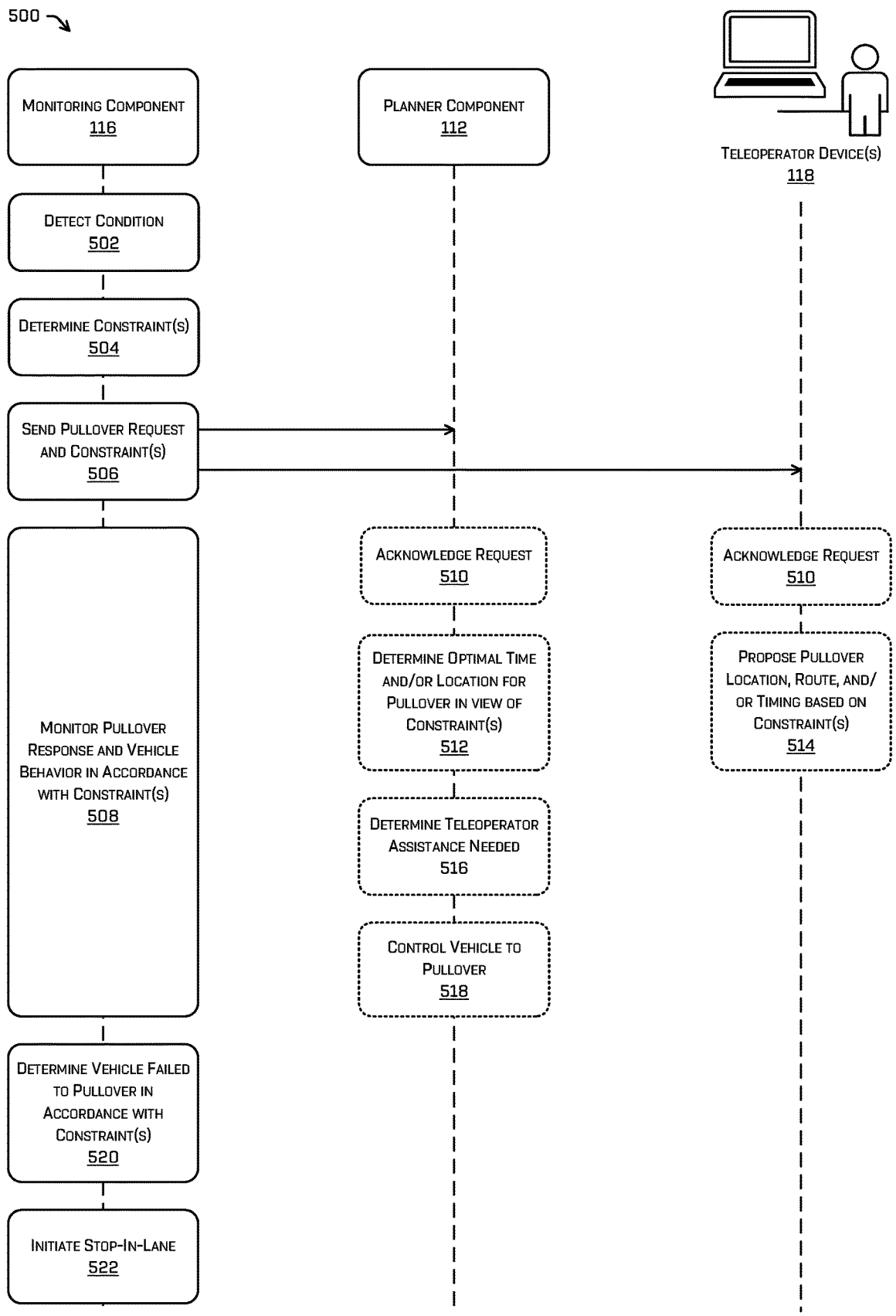
FIG. 5 is a data flow diagram illustrating yet another example process associated with the techniques described herein in which a monitoring component of the vehicle determines to stop the vehicle in a traffic lane.

FIG. 5 is a data flow diagram illustrating yet another example process 500 associated with the techniques described herein in which a monitoring component of the vehicle determines to stop the vehicle in a traffic lane. In the example process 500, the operations 410-418 (shown in broken lines) may not be performed, which may cause the monitoring component 116 to initiate the stop-in-lane.

At operation 502, the process 500 includes detecting, by the monitoring component 116, a presence of a condition necessitating that the vehicle pull over or otherwise cease from operating on a drivable portion (e.g., traffic lane) of a road surface in an environment. In some examples, the condition necessitating that the vehicle pull over may be a condition associated with a component or system of the vehicle, an occupant of the vehicle, an environmental condition, an emergency condition, and/or the like. For instance, the condition may be a fault associated with a component or system of the vehicle, such as a fault associated with a sensor of the vehicle, a perception system of the vehicle, a prediction system of the vehicle, components of the vehicle (e.g., wheels, tires, lights, electronics, doors, windows, etc.), the planner component 112, a network communication error with the teleoperator device(s) 118, or the like. As another example, the condition may be associated with an occupant of the vehicle, such as a medical condition of the occupant (e.g., seizure, fainting, injury, sickness, etc.), the occupant requesting to exit the vehicle, or the like. Additionally, the condition may be an environmental condition (e.g., snow, ice, rain, sleet, hail, intense heat, wind, flooding, etc.) making vehicle operation unsafe. Further, the condition may be an emergency condition, such as a medical emergency of a pedestrian proximate the vehicle.

At operation 504, the monitoring component 116 may determine one or more constraint(s) for operating the vehicle while the condition is present. In some examples, the one or more constraint(s) may be determined by the monitoring component 116 based at least in part on the condition, including based on a type of the condition, a cost associated with the condition, or the like. In some examples, the one or more constraint(s) may include a period of time (e.g., minutes, hours, days, weeks, months, etc.) that the vehicle can continue operating. That is, the vehicle may be required, by the constraint, to pull over (e.g., into a non-traffic lane) or otherwise cease from operating in a traffic lane prior to an expiration of the period of time. In some examples, a length of the period of time may be determined by the monitoring component 116 based on the condition and/or the magnitude of the cost associated with the condition. For instance, conditions that are more severe may be given a shorter period of time and conditions that are less severe may be given a longer period of time. In some examples, combinations of different conditions may cause the period of time to be shortened. For instance, if a period of time was determined at a first time for a first condition and then a second condition is detected, the period of time may be shortened, in some examples. In examples, the one or more constraint(s) may also include operational constraints (e.g., maximum velocity, maximum acceleration rates, maximum deceleration rates or maximum brake force, maximum turning angle, or the like), environmental constraints (e.g., only operate during daylight hours, only operate if weather is clear, etc.), traffic-related constraints (e.g., only operate during low traffic congestion periods), and/or the like.

At operation 506, the monitoring component 116 may send a pullover request including the one or more constraint(s) to the planner component 112 and/or the teleoperator device(s) 118. For instance, the pullover request and constraint(s) may indicate that the vehicle needs to be pulled over before an expiration of a period of time. At operation 508, the monitoring component 116 may monitor the pullover response and the vehicle behavior in accordance with the constraint(s). In other words, the monitoring component 116 may monitor whether the planner component 112 and/or the teleoperator device(s) 118 are responding to the request, as well as whether the vehicle is going to pull over in accordance with the constraint(s).

At operations 510, the planner component 112 and/or the teleoperator device(s) 118 may or may not acknowledge the request. At operation 512 the planner component 112 may or may not determine the optimal time and/or location for pulling the vehicle over in view of the constraint(s). At operation 514, the teleoperator device(s) 118 may or may not propose a pullover location, route, and/or timing based on the constraint(s). At operation 516, the planner component 112 may or may not determine that teleoperator assistance is needed. At operation 518, the planner component 112 may or may not control the vehicle to pull over.

At operation 520, the monitoring component 116 may determine that the vehicle failed to pullover in accordance with the constraint(s). In some examples, this failed pullover can happen for a number of reasons, including omitting one or more of the operations 510-518. In some examples, the failed pullover can happen based on the vehicle not pulling over prior to an expiration of a period of time constraint. At operation 522, the monitoring component 116 may initiate a stop-in-lane based at least in part on the vehicle failing to pull over in accordance with the constraint.

Figure 6:
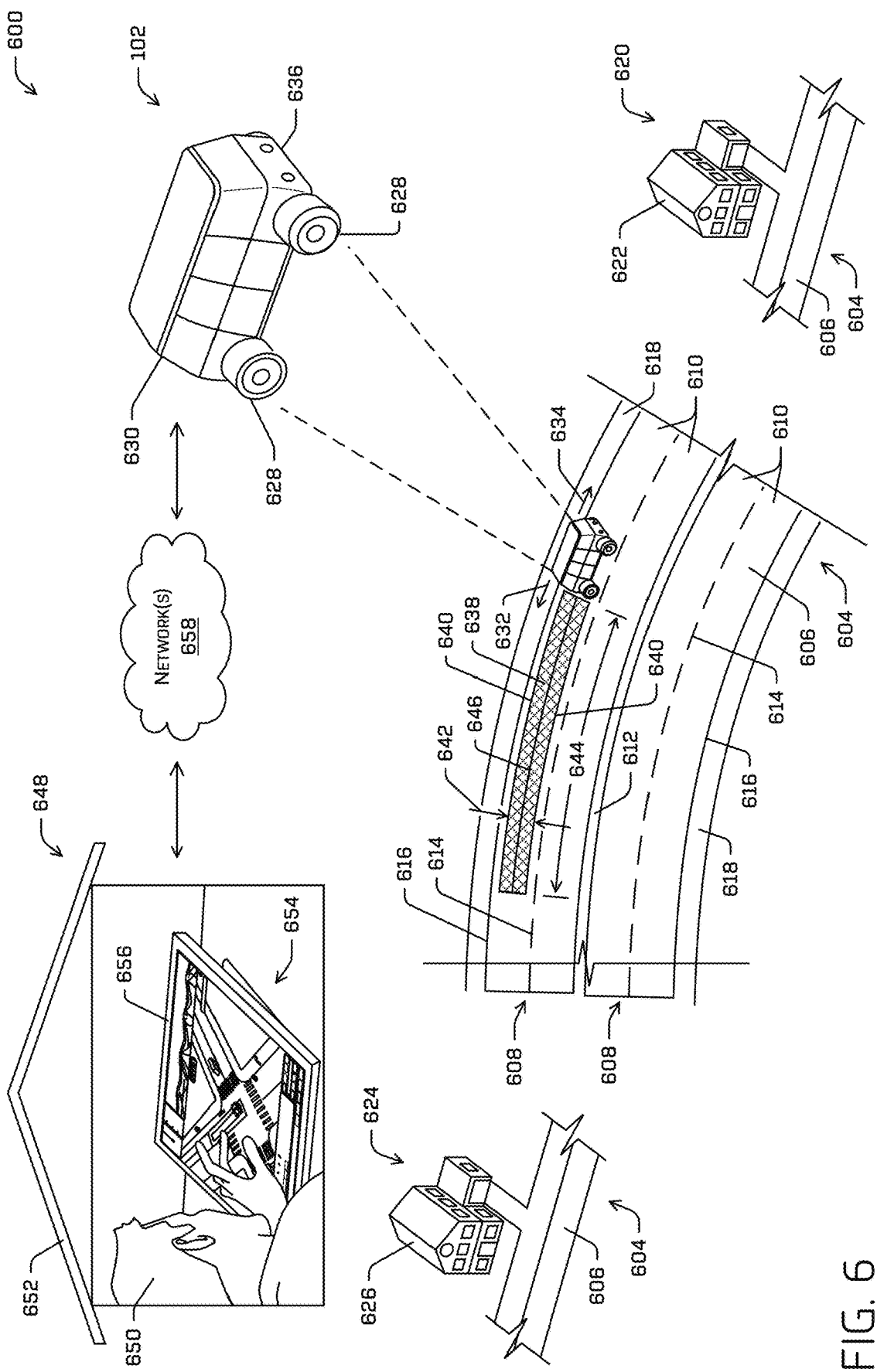
FIG. 6 is a schematic diagram illustrating an example environment through which an example vehicle travels while in communication with a teleoperator.

FIG. 6 is a schematic diagram illustrating an example environment 600 through which the vehicle 102 travels while in communication with a teleoperator 650. The example environment 600 includes a road network 604 including a plurality of example roads 606 having two pairs 608 of lanes 610 separated by a median or double-yellow line 612, with each of the lanes 610 of a pair 608 of lanes 610 defined by a lane dividing line 614 and lane boundary lines 616. The example road 606 also includes shoulders 618 located on opposite sides of the road 606. FIG. 6 also shows an example geographic location 620 associated with a departure location including a structure 622, such as a house or building, and an example destination 624 also including a structure 626, such as a house or building. The road network 604 provides a number of roads 606 defining a path between the geographic location 620 and the destination 624, and FIG. 6 shows an enlarged view of a portion of an example road 606. The road network 604 may include a number of features, such as curves, intersections with crossroads, crosswalks, traffic signs, traffic lights, railroad crossings, traffic circles, directional arrows, etc.

As shown in FIG. 6, the example vehicle 102 may travel through the example environment 600 via the road network 604 according to a path from the geographic location 620 to the destination 624. For the purpose of illustration, the vehicle 102 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 may be configured to control all functions from start to completion of the trip, including all parking functions, it may not include a driver. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 shown in FIG. 6 is an automobile having four wheels 628 and respective tires for each of the wheels 628. Other types and configurations of vehicles are contemplated, such as, for example, vans, sport utility vehicles, cross-over vehicles, trucks, buses, agricultural vehicles, and construction vehicles. The vehicle 102 may be powered by one or more internal combustion engines, one or more electric motors, hydrogen power, any combination thereof, and/or any other suitable power sources. In addition, although the example vehicle 102 has four wheels 628, the systems and methods described herein may be incorporated into vehicles having fewer or a greater number of wheels, tires, and/or tracks. The example vehicle 102 has four-wheel steering and may operate generally with equal performance characteristics in all directions, for example, such that a first end 630 of the vehicle 102 is a front end of the vehicle 102 when travelling in a first direction 632, and such that the first end 630 becomes the rear end of the vehicle 102 when traveling in the opposite, second direction 634, as shown in FIG. 6. Similarly, a second end 636 of the vehicle 102 is a front end of the vehicle 102 when travelling in the second direction 634, and such that the second end 636 becomes the rear end of the vehicle 102 when traveling in the opposite, first direction 632. Such a configuration may be referred to herein as "bidirectionality." These example bidirectional characteristics may facilitate greater maneuverability, for example, in small spaces or crowded environments, such as parking lots and urban areas.

In the example shown in FIG. 6, the vehicle 102 may use various sensors and a vehicle controller (e.g., planner component, perception component, etc.) to autonomously operate through the environment 600 along the path via the road network 604. For example, the vehicle controller may be configured to determine a driving corridor 638 defined by virtual boundaries 640 within which the vehicle 102 may travel. For example, the driving corridor 638 may have a variable corridor width 642 in the width direction of the vehicle 102, and a variable corridor length 644 extending in the direction of travel of the vehicle 102. In some examples, the virtual boundaries 640 of the driving corridor 638 may be determined based at least in part on sensor data received from sensors associated with the vehicle 102 and/or road network data received by the vehicle 102 via a road network data store, as explained in more detail herein. Though not illustrated in FIG. 6, such sensor data indicative of objects may be represented in such a corridor as indented or removed portions. In some examples, the vehicle 102 may travel along a drive line 646 within the driving corridor 638.

In some examples, the vehicle 102 may operate autonomously until the vehicle 102 encounters an event along the road 606, an abnormal condition (e.g., component or system fault, weather condition, etc.) for which it may request assistance from, for example, a teleoperations system 648 located remotely from the vehicle 102. For example, the vehicle 102 may encounter a construction zone associated with a portion of the path, and traffic in the vicinity of the construction zone may be under the direction of a construction worker who provides instructions for traffic to maneuver around the construction zone. Due in part to the unpredictable nature of this type of event, the vehicle 102 may request remote assistance from the teleoperations system 648. However, interaction between the vehicle 102 and the teleoperations system 648 is not limited to an event, and the vehicle 102 and teleoperations system 648 may interact for a number of reasons, such as to communicate directly with an occupant of the vehicle 102, to communicate with pedestrians proximate the vehicle 102, to control components of the vehicle 102, and the like. In some examples, the vehicle 102 may be a part of a fleet of vehicles in communication with the teleoperations system 648 via one or more communications networks 658, as explained in more detail herein.

In some examples, the teleoperations system 648 may include one or more teleoperators 650, which may be human beings located at a teleoperations center 652 or other remote location(s). In some examples, one or more of the teleoperators 650 may not be human. For example, they may be computer systems leveraging artificial intelligence, machine learning, and/or other decision-making strategies. In the example shown, the teleoperator 650 may interact with one or more vehicles 102 in the fleet of vehicles via a teleoperator interface 654. The teleoperator interface 654 may include one or more displays 656 configured to provide the teleoperator 650 with data related to operation of the vehicle 102, a subset of the fleet of vehicles, and/or the fleet of vehicles. For example, the display(s) 656 may be configured to show data related to sensor signals received from the vehicles 102, data related to the road network 604, and/or additional data or information to facilitate providing assistance to the vehicles 102. In addition, the teleoperator interface 654 and/or the one or more displays 656 may also include a teleoperator input device configured to allow the teleoperator 650 to provide information to one or more of the vehicles 102, for example, in the form of teleoperations signals providing guidance to the vehicles 102. The teleoperator input device may include one or more of a touch-sensitive screen, a stylus, a mouse, a dial, a keypad, and/or a gesture-input system configured to translate gestures performed by the teleoperator 650 into input commands for the teleoperator interface 654. As explained in more detail herein, the teleoperations system 648 may provide one or more of the vehicles 102 with guidance to avoid, maneuver around, or pass-through events.

In some examples, in order to provide the teleoperator 650 with information and/or data associated with one or more vehicles, the teleoperator interface 654 may present a user interface on the one or more displays 656. The user interface may include a representation of an environment in which the vehicle is operating, such as the environment 600. For instance, the representation of the environment 600 may include, in some examples, representations of the vehicle 102, the road network 604, including the roads 606, lanes 610, median or double-yellow line 612, dividing line 614, and lane boundary lines 616. Additionally, the representation of the environment 600 may also include representations of structures, such as structures 622 and 626, other vehicles, pedestrians, motorists, traffic lights and/or traffic signage, and the like. Additionally, in some instances, the user interface may present notifications of objects (e.g., other vehicles, pedestrians, etc.) that are disposed outside of a field of view shown on the display 656 but that will eventually enter the field of view.

In some examples, the user interface may include a communication interface that is presented on the one or more displays 656 to enable the teleoperator 650 to communicate with one or more occupants of the vehicle 102. For instance, the communication interface may enable the teleoperator 650 to send messages to an occupant of the vehicle 102. The messages may include SMS text messages that are sent to a device associated with the occupant, such as a mobile device of the occupant, a display screen of the vehicle 102 that is associated with a seat occupied by the occupant, etc. Additionally, or alternatively, the messages may include audio messages (e.g., voice messages, pre-recorded voice messages, two-way voice communications, etc.) that are communicated audibly using one or more devices of the vehicle 102 capable of audio output (e.g., speakers of the vehicle, display screens of the vehicle, etc.), a device associated with the occupant, and the like. Additionally, or alternatively, in some examples the communication interface may enable the teleoperator 650 to communicate directly or indirectly with any one of pedestrians who are proximate the vehicle, third parties (e.g., 911 operators, first responders, etc.), other remote users, operators of the vehicle, and the like. In even further examples, the communication interface may enable the teleoperator 650 to send files to the occupant, such as images, videos, documents, and the like. In some examples, occupants of the vehicle may communicate requests for the vehicle 102 to pull over via the communication interface (e.g., in the case of a condition observed by the occupant, such as an emergency within the vehicle (e.g., sick occupant), emergency outside of the vehicle, or the like).

Figure 7:
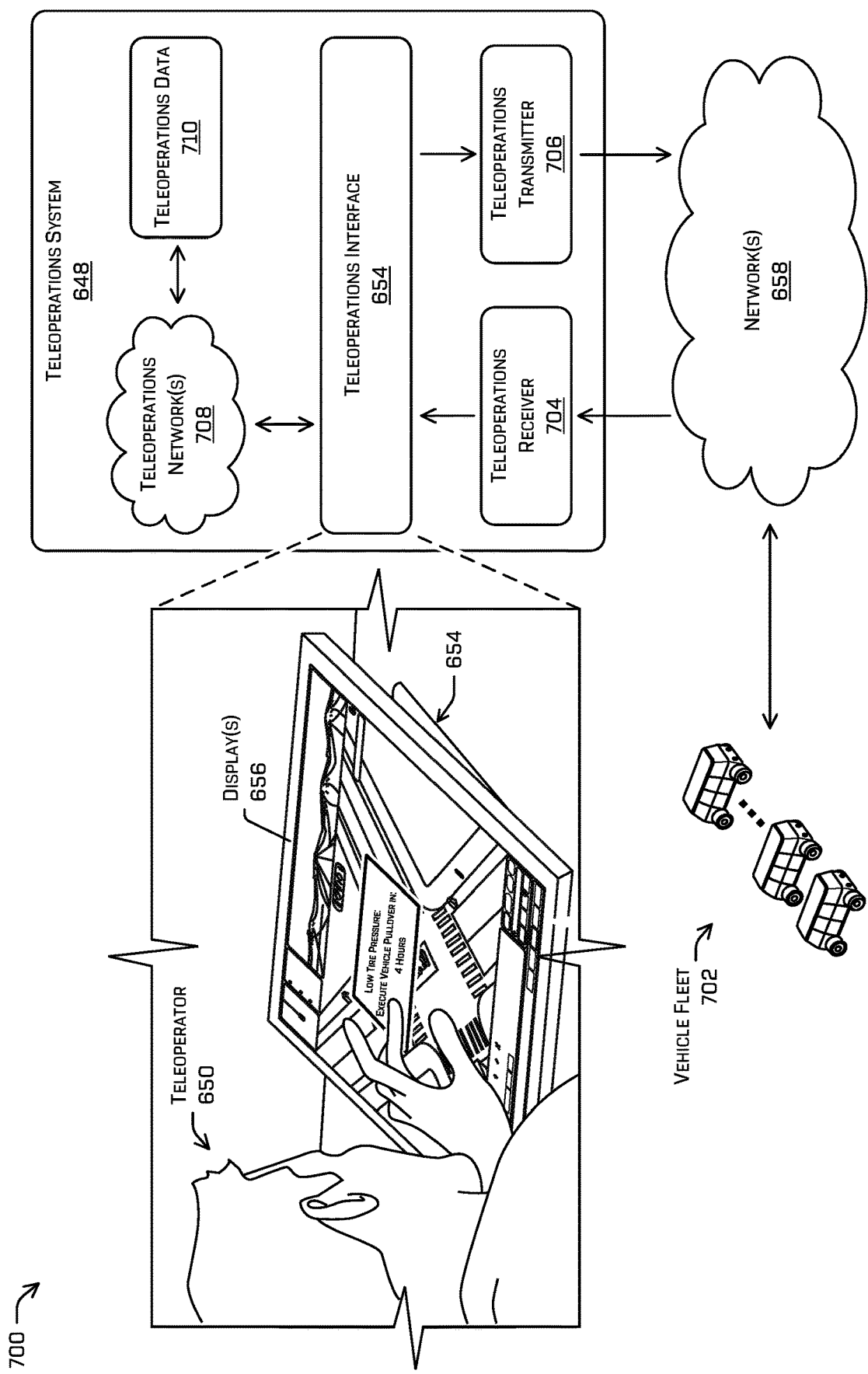
FIG. 7 is a schematic and block diagram illustrating example detail of a teleoperations system for remotely monitoring a fleet of vehicles.

FIG. 7 illustrates an example architecture 700 including an example teleoperations system 648 for remotely monitoring a fleet of vehicles 702. The example fleet of vehicles 702 includes a plurality of vehicles 102, at least some which are communicatively coupled to the teleoperations system 648, for example, via the network(s) 658 and a teleoperations receiver 704 and a teleoperations transmitter 706 associated with the teleoperations system 648. For example, a vehicle 102 may send communication signals via a network interface of the vehicle 102, which are received by the teleoperations receiver 704. In some examples, the communication signals may include, for example, sensor data from sensor signals generated by one or more sensors associated with the vehicle 102 (and/or representations thereof), road network data from a road network data store, request to pull one or more vehicles of the fleet over, health data associated with systems or components of the vehicle, and/or the like.

In some examples, the communication signals may include data associated with a condition of the vehicle 102 and its systems, such as, for example, its current position, current speed, current path and/or trajectory, current occupancy, status of one or more components and/or subcomponents, messages (e.g., messages transmitted between any component and/or subcomponent), the level of charge of one or more of its batteries, and/or the operational status of its sensors and drive systems. In some examples, the communication signals from the vehicle 102 may include a request for information from the teleoperations system 648. Such information, may include, for example, assistance with operation of the vehicle 102 in the form of, for example, information about objects, the road network 604, the road 606, the global map, the local map, collaboration with respect to vehicle operations and maneuvers (e.g., intelligent pull over), and/or confirmation of information and/or actions proposed by the vehicle 102.

As shown in FIG. 7, the teleoperations receiver 704 may be communicatively coupled to the teleoperations interface 654, and in some examples, the teleoperator 650 may be able to access the sensor data, the road network data, and/or any other data in the communication signals received from a vehicle 102 via the teleoperations interface 654. In some examples, the teleoperator 650 may be able to selectively access the sensor data, road network data, and/or other data using the teleoperations interface 654 and view the selected data via one or more of the displays 656. In some examples, the displays 656 may display digital representations, simplistic pictorial representations, animations, bounding boxes, arrows indicating a bearing and/or velocity of objects, icons representing objects, colorization of the sensor data, and/or other representations of the data, which may simplify interpretation by a teleoperator 650. In some examples, the displays 656 may additionally or alternatively display raw sensor data (e.g., camera images, lidar point clouds, etc.).

In the example shown, the teleoperations system 648 also includes a teleoperations network 708 that is configured to provide communication between two or more of the teleoperations interfaces 654 and the respective teleoperators 650, and/or communication with teleoperations data 710. For example, the teleoperations system 648 may include a plurality of teleoperations interfaces 654 and respective teleoperators 650, and the teleoperators 650 may communicate with one another via the teleoperations network 708 to facilitate and/or coordinate the guidance provided to the vehicles 102 of the fleet 702. For instance, the teleoperations interface 654 may present a user interface on the displays 656 that includes a communication interface for teleoperators 650 to communicate with other teleoperators 650, occupants of the vehicle 102, pedestrians proximate the vehicle 102 of the vehicle fleet 702, and the like. In some examples, there may be a teleoperator 650 assigned to each of the vehicles 102, and in some examples, a teleoperator 150 may be assigned to more than a single vehicle 102 of the fleet of vehicles 702. In some examples, more than one teleoperator 650 may be assigned to a single vehicle 102. In some examples, teleoperators 650 may not be assigned to specific vehicles 102 of the vehicle fleet 702 but may instead provide guidance to vehicles 102 that have encountered certain types of events and/or to vehicles 102 based on, for example, a level of urgency associated with the vehicle's encounter with the event. In some examples, data associated with an event and/or the guidance provided by a teleoperator 650 may be stored by the teleoperations system 648, for example, in storage for the teleoperations data 710, and/or accessed by other teleoperators 650.

In some examples, the teleoperation data 710 may be accessible by the teleoperators 150, for example, via the teleoperations interface 154, for use in providing guidance to the vehicles 102. For example, the teleoperations data 710 may include global and/or local map data related to a road network, events associated with the road network, and/or travel conditions associated with the road network due to, for example, traffic volume, weather conditions, construction zones, and/or special events. In some examples, the teleoperations data 710 may include data associated with one more of the vehicles 102 of the vehicle fleet 702, such as, for example, maintenance and service information, and/or operational history including, for example, event history associated with the vehicle 102, path histories, occupancy histories, and other types of data associated with the vehicle 102.

Figure 8:
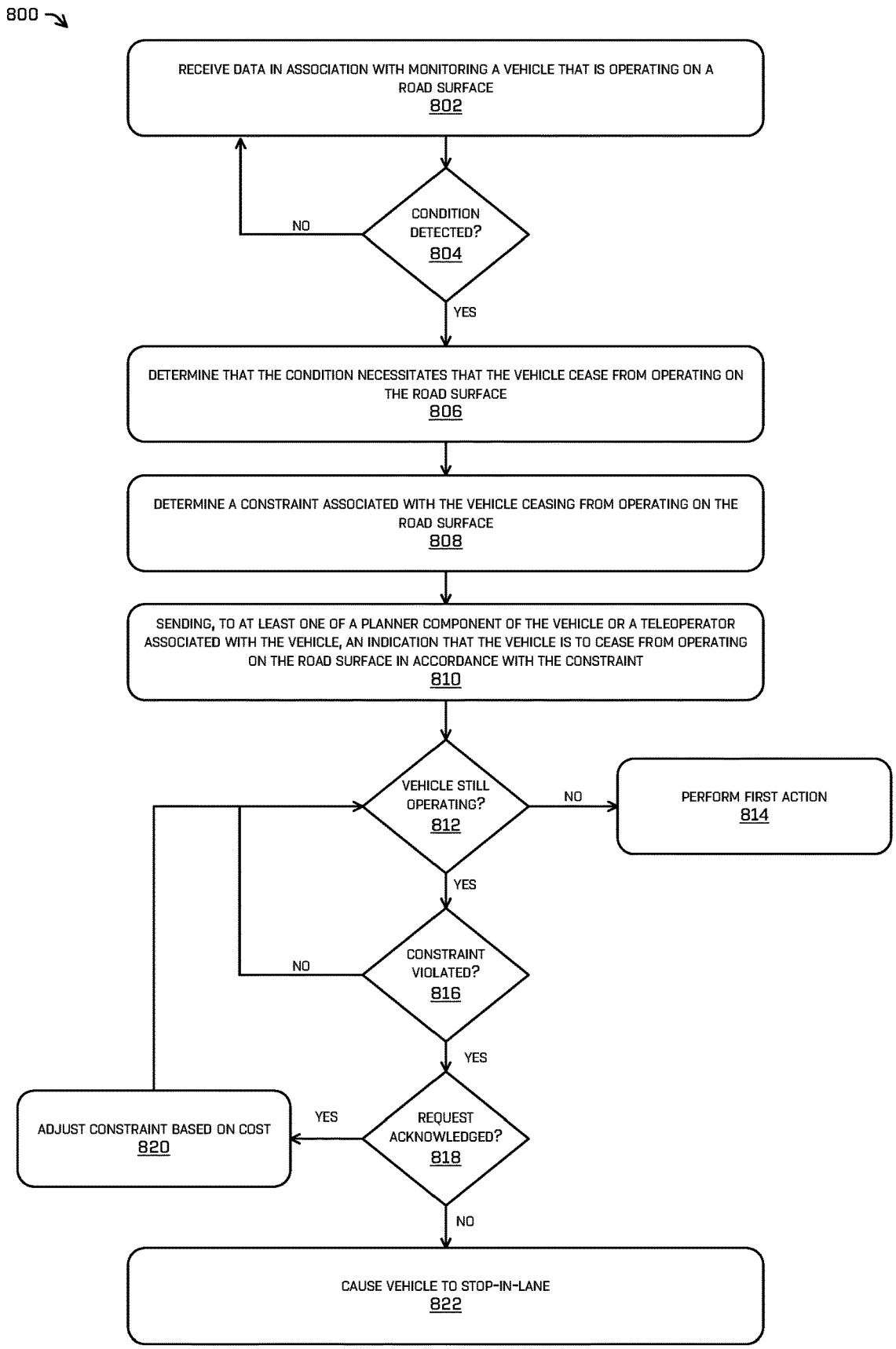
FIG. 8 is a flowchart illustrating an example process associated with the technologies disclosed herein for intelligent vehicle pull over.

FIG. 8 is a flowchart showing an example method of presenting various user interfaces on a display that are associated with remotely monitoring a vehicle. The method illustrated in FIG. 8 is described with reference to one or more of the vehicles, teleoperations systems, and user interfaces described in FIGS. 1-7 for convenience and ease of understanding. However, the process illustrated in FIG. 8 is not limited to being performed using the vehicles, teleoperations systems, and user interfaces described in FIGS. 1-7, and may be implemented using any of the other vehicles, teleoperations systems, and user interfaces described in this application, as well as vehicles, teleoperations systems, and user interfaces other than those described herein. Moreover, the vehicles, teleoperations systems, and user interfaces described herein are not limited to performing the method illustrated in FIG. 8.

The process 800 is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely. Moreover, the process 800 may be combined in whole or in part with other methods.

The process 800 begins at operation 802, which includes receiving data in association with monitoring a vehicle that is operating on a road surface. For instance, the monitoring component 116 may receive the data. In some examples, the data may include health or diagnostic data associated with components or systems of the vehicle, environmental or weather data associated with the environment, data associated with occupants of the vehicle, or the like.

At operation 804, the process 800 includes determining whether a condition has been detected. For instance, the monitoring component 116 may determine that the condition has been detected. If a condition is detected, the process 800 proceeds to operation 806. If a condition is not detected, the process 800 proceeds back to operation 802.

At operation 806, the process 800 includes determining that the condition necessitates that the vehicle cease from operating on the road surface. For instance, the monitoring component 116 may determine that the condition necessitates that the vehicle cease from operating on the road surface. In some examples, the monitoring component 116 may make this determination based on a type of the condition, a cost associated with the condition, or the like.

At operation 808, the process 800 includes determining a constraint associated with the vehicle ceasing from operating on the road surface. For instance, the monitoring component 116 may determine the constraint(s) associated with the vehicle ceasing from operating on the road surface. In some instances, the constraint(s) may be determined based at least in part on the type of the condition, the cost associated with the condition, or the like.

At operation 810, the process 800 includes sending, to at least one of a planner component of the vehicle or a teleoperator associated with the vehicle, an indication that the vehicle is to cease from operating on the road surface in accordance with the constraint. For instance, the monitoring component 116 may send the indication that the vehicle is to cease from operating on the road surface in accordance with the constraint.

At operation 812, the process 800 includes determining whether the vehicle is still operating. For instance, the monitoring component 116 may determine whether the vehicle is still operating. If the vehicle is still operating, the process 800 may continue to operation 816. If the vehicle is no longer operating, the process 800 proceeds to operation 814.

At operation 814, the process 800 includes performing a first action. In some examples, the first action may be to clear the pending request for the vehicle to pull over. At operation 816, the process 800 includes determining whether the constraint has been violated. For instance, the monitoring component 116 may determine whether the constraint has been violated. If the constraint has been violated, the process 800 proceeds to operation 818. If the constraint has not been violated, the process 800 returns to operation 812.

At operation 818, the process 800 includes determining whether the request has been acknowledged. For instance, the monitoring component 116 may determine whether the request has been acknowledged. If the request has been acknowledged, the process 800 proceeds to operation 820. However, if the request has not been acknowledged, the process 800 proceeds to operation 822.

At operation 820, the process 800 includes adjusting the constraint based on the cost. For instance, the monitoring component may adjust the constraint (e.g., extend the period of time) based on the cost. Additionally, at operation 822, the process 800 includes causing the vehicle to stop-in-lane. For instances, the monitoring component 116 may initiate the stop-in-lane of the vehicle 102.

Figure 9:
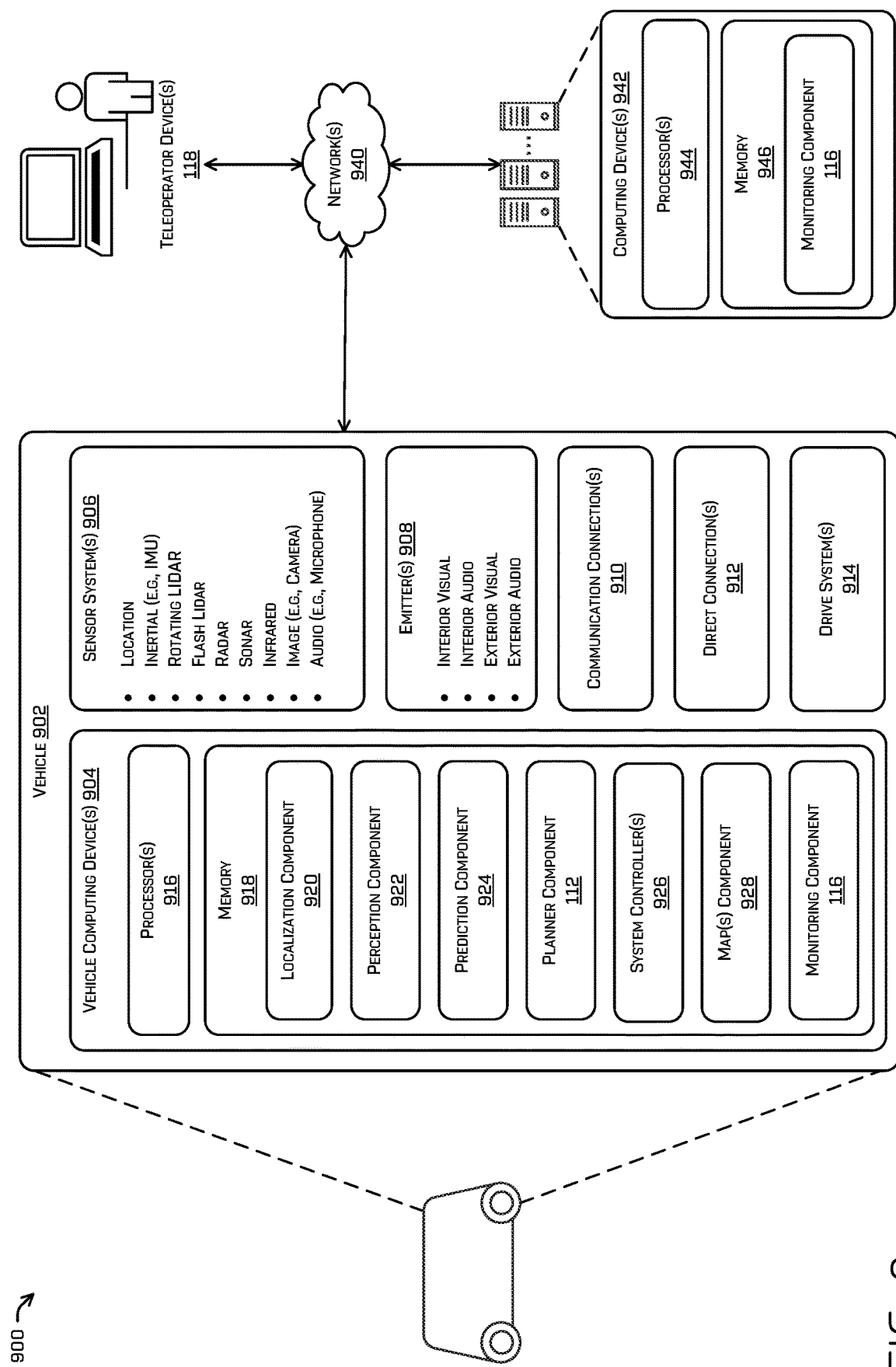
FIG. 9 is a block diagram illustrating an example system that may be used for performing aspects of the techniques described herein.

FIG. 9 is a block diagram illustrating an example system 900 for implementing some of the various technologies described herein. In some examples, the system 900 may include one or multiple features, components, and/or functionality of examples described herein with reference to other figures, such as FIGS. 1-8.

The system 900 may include a vehicle 902. In some examples, the vehicle 902 may include some or all of the features, components, and/or functionality described above with respect to vehicle 102. For instance, the vehicle 902 may comprise a bidirectional vehicle. As shown in FIG. 9, the vehicle 902 may also include a vehicle computing device 904, one or more sensor systems 906, one or more emitters 908, one or more communication connections 910, one or more direct connections 912, and/or one or more drive assemblies 914.

The vehicle computing device 904 can, in some examples, include one or more processors 916 and memory 918 communicatively coupled with the one or more processors 916. In the illustrated example, the vehicle 902 is an autonomous vehicle; however, the vehicle 902 could be any other type of vehicle (e.g., automobile, truck, bus, aircraft, watercraft, train, etc.), or any other system having components such as those illustrated in FIG. 9 (e.g., a robotic system, an automated assembly/manufacturing system, etc.). In examples, the one or more processors 916 may execute instructions stored in the memory 918 to perform one or more operations on behalf of the one or more vehicle computing devices 904.

The memory 918 of the one or more vehicle computing devices 904 stores a localization component 920, a perception component 922, a prediction component 924, a planner component 112, one or more system controllers 926, a map(s) component 928, and the monitoring component 116. Though depicted in FIG. 9 as residing in memory 918 for illustrative purposes, it is contemplated that the localization component 920, perception component 922, prediction component 924, planner component 112, one or more system controllers 926, map(s) component 928, and/or the monitoring component 116, can additionally, or alternatively, be accessible to the vehicle 902 (e.g., stored on, or otherwise accessible from, memory remote from the vehicle 902, such as memory 946 of one or more computing device(s) 942).

In at least one example, the localization component 920 can include functionality to receive data from the sensor system(s) 906 to determine a position and/or orientation of the vehicle 902 (e.g., one or more of an x-, y-, z-position, roll, pitch, or yaw). For example, the localization component 920 can include and/or request/receive a map of an environment and can continuously determine a location and/or orientation of the autonomous vehicle within the map. In some instances, the localization component 920 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 906 or received from one or more other devices (e.g., computing devices 942) to accurately determine a location of the autonomous vehicle. In some instances, the localization component 920 can provide data to various components of the vehicle 902 to determine an initial position of the autonomous vehicle for generating a trajectory and/or for determining to retrieve map data.

In some instances, the perception component 922 can include functionality to perform object tracking, detection, segmentation, and/or classification. In some examples, the perception component 922 can provide processed sensor data that indicates a presence of an entity that is proximate to the vehicle 902 and/or a classification of the entity as an entity type (e.g., car, pedestrian, cyclist, animal, building, tree, road surface, curb, sidewalk, unknown, etc.). In additional and/or alternative examples, the perception component 922 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The prediction component 924 can receive sensor data from the sensor system(s) 906, map data, and/or perception data output from the perception component 922 (e.g., processed sensor data) and can output predictions associated with one or more objects within the environment of the vehicle 902. Predictions can include predicted trajectories associated with objects in the environment in which the vehicle 902 is operating.

In general, the planner component 112 can determine a path for the vehicle 902 to follow to traverse through an environment. For example, the planner component 112 can determine various routes and trajectories and various levels of detail. For example, the planner component 112 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planner component 112 can generate an instruction for guiding the autonomous vehicle along at least a portion of the route from the first location to the second location. In at least one example, the planner component 112 can determine how to guide the autonomous vehicle from a first waypoint in the sequence of waypoints to a second waypoint in the sequence of waypoints. In some examples, the instruction can be a trajectory, or a portion of a trajectory.

In at least one example, the vehicle computing device 904 can include one or more system controllers 926, which can be configured to control steering, propulsion, braking, safety, emitters, communication, components, and other systems of the vehicle 902. These system controller(s) 926 can communicate with and/or control corresponding systems of the drive system(s) 914 and/or other components of the vehicle 902.

The memory 918 can further include the map(s) component 928 to maintain and/or update one or more maps (not shown) that can be used by the vehicle 902 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 902 can be controlled based at least in part on the maps. That is, the maps can be used in connection with the localization component 920, the perception component 922, and/or the planner component 112 to determine a location of the vehicle 902, identify objects in an environment, and/or generate routes and/or trajectories to navigate within an environment.

In some instances, aspects of some or all of the memory-stored components discussed herein can include any models, algorithms, and/or machine learning algorithms. For example, in some instances, components in the memory 918 (and the memory 946, discussed in further detail below) such as the perception component 922, planner component 112, and/or monitoring component 116 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 9 (ID9), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 906 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 906 can include multiple instances of each of these or other types of sensors. For instance, the lidar sensors can include individual lidar sensors located at the corners, front, back, sides, and/or top of the vehicle 902. As another example, the image sensors can include multiple image sensors disposed at various locations about the exterior and/or interior of the vehicle 902. As an even further example, the audio sensors can include multiple audio sensors disposed at various locations about the exterior and/or interior of the vehicle 902. Additionally, the audio sensors can include an array of a plurality of audio sensors for determining directionality of audio data. The sensor system(s) 906 can provide input to the vehicle computing device 904. Additionally, or alternatively, the sensor system(s) 906 can send sensor data, via the one or more networks 158, to the one or more computing device(s) 942 at a particular frequency, after a lapse of a predetermined period of time, in near real-time, etc.

The vehicle 902 can also include one or more emitters 908 for emitting light and/or sound. The emitters 908 in this example include interior audio and visual emitters to communicate with passengers of the vehicle 902. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 908 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 902 can also include one or more communication connection(s) 910 that enable communication between the vehicle 902 and one or more other local or remote computing device(s). For instance, the communication connection(s) 910 can facilitate communication with other local computing device(s) on the vehicle 902 and/or the drive system(s) 914. Also, the communication connection(s) 910 can allow the vehicle 902 to communicate with other nearby computing device(s) (e.g., other nearby vehicles, traffic signals, etc.). The communications connection(s) 910 also enable the vehicle 902 to communicate with the remote teleoperations system 148 or other remote services.

The communications connection(s) 910 can include physical and/or logical interfaces for connecting the vehicle computing device(s) 904 to another computing device (e.g., computing device(s) 942) and/or a network, such as network(s) 940. For example, the communications connection(s) 910 can enable Wi-Fi-based communication such as via frequencies defined by the IEEE 702.11 standards, short range wireless frequencies such as Bluetooth®, cellular communication (e.g., 2G, 9G, 4G, 4G LTE, 5G, etc.) or any suitable wired or wireless communications protocol that enables the respective computing device to interface with the other computing device(s).

In at least one example, the direct connection 912 of vehicle 902 can provide a physical interface to couple the one or more drive system(s) 914 with the body of the vehicle 902. For example, the direct connection 912 can allow the transfer of energy, fluids, air, data, etc. between the drive system(s) 914 and the vehicle 902. In some instances, the direct connection 912 can further releasably secure the drive system(s) 914 to the body of the vehicle 902.

In at least one example, the vehicle 902 can include one or more drive assemblies 914. In some examples, the vehicle 902 can have a single drive assembly 914. In at least one example, if the vehicle 902 has multiple drive assemblies 914, individual drive assemblies 914 can be positioned on opposite longitudinal ends of the vehicle 902 (e.g., the leading and trailing ends, the front and the rear, etc.).

The drive system(s) 914 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 914 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive system(s) 914. Furthermore, the drive system(s) 914 may also include one or more communication connection(s) that enable communication by the respective drive assembly with one or more other local or remote computing device(s).

The computing device(s) 942 can include one or more processors 944 and memory 946 that may be communicatively coupled to the one or more processors 944. The memory 946 may store the monitoring component 116, in some instances. In some examples, the computing device(s) 942 may be associated with the teleoperations system 648 described in FIGS. 6 and 7. For instance, the computing device(s) 942 may represent a display 656 of the teleoperations interface 654 of the teleoperations system 648. Additionally, or alternatively, the computing devices(s) 942 may be leveraged by the teleoperations system 648 to receive and/or process data on behalf of the teleoperations system 648.

The processor(s) 916 of the vehicle 902 and the processor(s) 944 of the computing device(s) 942 can be any suitable processor capable of executing instructions to process data and perform operations as described herein. By way of example and not limitation, the processor(s) 916 and 944 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 918 and 946 are examples of non-transitory computer-readable media. The memory 918 and 946 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component. It should be noted that while FIG. 9 is illustrated as a distributed system, in alternative examples, components of the vehicle 902 can be associated with the computing device(s) 942 and/or components of the computing device(s) 942 can be associated with the vehicle 902. That is, the vehicle 902 can perform one or more of the functions associated with the computing device(s) 942, and vice versa.

CONCLUSION

Although the discussion above sets forth example implementations of the described techniques, other architectures may be used to implement the described functionality and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

Example Clauses

A. A system comprising: one or more processors; and one or more non-transitory computer-readable media storing instructions that, when executed, cause the one or more processors to perform operations comprising: determining, by a monitoring component associated with a vehicle, a presence of a condition necessitating that the vehicle cease from operating on a portion of a road surface; determining, by the monitoring component and based at least in part on the condition, a period of time for the vehicle to continue operating on the portion of the road surface; sending, by the monitoring component and to at least one of a teleoperator associated with the vehicle or a planner component of the vehicle, a request for the vehicle to cease from operating on the portion of the road surface prior to an expiration of the period of time; receiving, at the monitoring component and prior to the expiration of the period of time, an indication that at least one of the teleoperator or the planner component acknowledged the request; and based at least in part on receiving the indication prior to the expiration of the period of time, refraining from causing the vehicle to stop on the portion of the road surface such that the vehicle impedes a flow of traffic.

B. The system as recited in paragraph A, the operations further comprising: determining, by the monitoring component, a cost associated with the condition; and based at least in part on a magnitude of the cost, refraining from causing the vehicle to initiate a stop at a current location of the vehicle, the current location of the vehicle being on the portion of the road surface such that the vehicle impedes the flow of traffic, wherein a length of the period of time is at least partially based on the cost.

C. The system as recited in any one of paragraphs A-B, wherein the portion of the road surface is a traffic lane of the road surface that is designated for movement of vehicles, and wherein the request for the vehicle to cease from operating on the portion of the road surface is a request for the vehicle to stop at a location that is outside of the traffic lane or another traffic lane.

D. The system as recited in any one of paragraphs A-C, wherein the indication further indicates that at least one of the teleoperator or the planner component is responding to the request, the operations further comprising determining, based at least in part on the indication, an additional period of time for the at least one of the teleoperator or the planner component to provide a destination location for the vehicle to stop that is off the portion of the road surface, wherein the additional period of time extends beyond the expiration of the period of time.

E. The system as recited in any one of paragraphs A-D, wherein a type of the condition is associated with at least one of: a fault of a component or system of the vehicle; an occupant of the vehicle; an environmental condition; or an emergency condition.

F. A method comprising: determining, by a monitoring component of a vehicle, a presence of a condition necessitating that the vehicle cease from operating on a road surface; determining, by the monitoring component, a constraint associated with the vehicle ceasing from operating on the road surface, the constraint including a period of time, the vehicle to cease from operating on the road surface prior to an expiration of the period of time; sending, by the monitoring component and to a planner component of the vehicle, an indication that the vehicle is to cease from operating on the road surface in accordance with the constraint; and based at least in part on a determination that the planner component acknowledged the indication in accordance with the constraint, refraining, by the monitoring component, from causing the vehicle to stop on the road surface such that the vehicle impedes a flow of traffic.

G. The method as recited in paragraph F, wherein a length of the period of time is at least partially based on a cost associated with the condition, the cost determined based at least in part on at least one of a significance of the condition, a type of the condition, or a remedy for the condition.

H. The method as recited in any one of paragraphs F-G, further comprising allocating an additional period of time for the vehicle to cease from operating on the road surface based at least in part on the determination that the planner component acknowledged the indication, wherein the additional period of time expires after the expiration of the period of time.

I. The method as recited in any one of paragraphs F-H, wherein the condition is a fault associated with a component or system of the vehicle, the fault rendering the vehicle in a degraded but functional state.

J. The method as recited in any one of paragraphs F-I, further comprising: subsequent to the determination that the planner component acknowledged the indication, monitoring whether the vehicle has ceased from operating on the road surface in accordance with the constraint; and based at least in part on a determination that the vehicle has continued operating on the road surface in violation of the constraint, causing the vehicle to stop on the road surface.

K. The method as recited in any one of paragraphs F-J, wherein a type of the condition is at least one of: a fault associated with a component or system of the vehicle; a condition associated with an occupant of the vehicle; an environmental condition; or an emergency condition.

L. The method as recited in any one of paragraphs F-K, further comprising: determining, based at least in part on the condition, to invoke a teleoperator associated with the vehicle; and sending, to a computing device associated with the teleoperator, a request for support in causing the vehicle to cease from operating on the road surface, the request including an indication of the constraint.

M. The method as recited in any one of paragraphs F-L, wherein the road surface comprises a traffic lane and refraining from causing the vehicle to stop on the road surface such that the vehicle impedes the flow of traffic comprises refraining from causing the vehicle to stop in the traffic lane on the road surface.

N. The method as recited in any one of paragraphs F-M, wherein the monitoring component runs on a separate hardware device of the vehicle than the planner component.

O. The method as recited in any one of paragraphs F-N, further comprising: detecting at least one of change to the condition or a presence of another condition; and at least one of extending or reducing a length of the period of time based at least in part on the change to the condition or the presence of the other condition.

P. One or more non-transitory computer-readable media storing instructions that, when executed, cause one or more processors to perform operations comprising: determining, by a monitoring component of a vehicle, a presence of a condition necessitating that a vehicle cease from operating on a road surface; determining, by the monitoring component, a constraint associated with the vehicle ceasing from operating on the road surface, the constraint including a period of time, the vehicle to cease from operating on the road surface prior to an expiration of the period of time; sending, by the monitoring component and to a planner component of the vehicle, an indication that the vehicle is to cease from operating on the road surface in accordance with the constraint; and based at least in part on a determination that the planner component acknowledged the indication in accordance with the constraint, refraining, by the monitoring component, from causing the vehicle to stop on the road surface such that the vehicle impedes a flow of traffic.

Q. The one or more non-transitory computer-readable media as recited paragraph P, wherein a length of the period of time is at least partially based on a cost associated with the condition, the cost determined based at least in part on at least one of a significance of the condition, a type of the condition, or a remedy for the condition.

R. The one or more non-transitory computer-readable media as recited in any one of paragraphs P-Q, the operations further comprising allocating an additional period of time for the vehicle to cease from operating on the road surface based at least in part on the determination that the planner component acknowledged the indication, wherein the additional period of time expires after the expiration of the period of time.

S. The one or more non-transitory computer-readable media as recited in any one of paragraphs P-R, wherein the condition is a fault associated with a component or system of the vehicle, the fault rendering the vehicle in a degraded but functional state.

T. The one or more non-transitory computer-readable media as recited in any one of paragraphs P-S, the operations further comprising: detecting at least one of change to the condition or a presence of another condition; and at least one of extending or reducing a length of the period of time based at least in part on the change to the condition or the presence of the other condition.

What is claimed is:

1. A system comprising:
one or more processors; and
one or more non-transitory computer-readable media storing instructions that, when executed, cause the one or more processors to perform operations comprising:
  determining, by a monitoring component of a vehicle, a presence of a condition necessitating that the vehicle cease operating on a portion of a road surface;
  determining, by the monitoring component and based on the condition, a period of time for the vehicle to continue operating on the portion of the road surface;
  sending, by the monitoring component and to at least one of a teleoperator associated with the vehicle or a planner component of the vehicle, a request for the vehicle to cease operating on the portion of the road surface prior to an expiration of the period of time, wherein the teleoperator is remote from the vehicle;
  receiving, at the monitoring component and prior to the expiration of the period of time, an indication that at least one of the teleoperator or the planner component acknowledged the request;
  based on receiving the indication prior to the expiration of the period of time, refraining from causing the vehicle to stop on the portion of the road surface in a way that impedes a flow of traffic;
  determining, by the monitoring component and based on the expiration of the period of time, whether the vehicle has ceased operating on the road surface; and
  based on a determination that the vehicle has continued operating on the road surface beyond the expiration of the period of time, causing the vehicle to stop on the road surface.

2. The system of claim 1, the operations further comprising:
determining, by the monitoring component, a cost associated with the condition; and
based at least in part on a magnitude of the cost, refraining from causing the vehicle to initiate a stop at a current location of the vehicle, the current location of the vehicle being on the portion of the road surface such that the vehicle impedes the flow of traffic,
wherein a length of the period of time is at least partially based on the cost.

3. The system of claim 1, wherein the portion of the road surface is a traffic lane of the road surface that is designated for movement of vehicles, and wherein the request for the vehicle to cease operating on the portion of the road surface is a request for the vehicle to stop at a location that is outside of the traffic lane or outside of another traffic lane.

4. The system of claim 1, wherein the indication further indicates that at least one of the teleoperator or the planner component is responding to the request, the operations further comprising determining, based at least in part on the indication, an additional period of time for the at least one of the teleoperator or the planner component to provide a destination location for the vehicle to stop that is off the portion of the road surface, wherein the additional period of time extends beyond the expiration of the period of time.

5. The system of claim 1, wherein a type of the condition is associated with at least one of:
a fault of a component or system of the vehicle;
an occupant of the vehicle;
an environmental condition; or
an emergency condition.

6. The system of claim 1, the operations further comprising:
determining that the vehicle has continued operating on the road surface in violation of the constraint due to one or more of a severed connection with the teleoperator or an error associated with the planner component of the vehicle.

7. A method comprising:
determining, by a monitoring component of a vehicle, a presence of a condition necessitating that the vehicle cease operating on a road surface;
determining, by the monitoring component, a constraint associated with the vehicle ceasing operating on the road surface, the constraint including a period of time, the vehicle to cease operating on the road surface prior to an expiration of the period of time;
sending, by the monitoring component and to a planner component of the vehicle, an indication that the vehicle is to cease operating on the road surface in accordance with the constraint;
based on a determination that the planner component acknowledged the indication in accordance with the constraint, refraining, by the monitoring component, from causing the vehicle to stop on the road surface in a way that impedes a flow of traffic;
subsequent to the determination that the planner component acknowledged the indication, monitoring whether the vehicle has ceased operating on the road surface in accordance with the constraint; and
based on a determination that the vehicle has continued operating on the road surface in violation of the constraint, causing the vehicle to stop on the road surface.

8. The method of claim 7, wherein a length of the period of time is at least partially based on a cost associated with the condition, the cost determined based at least in part on at least one of a significance of the condition, a type of the condition, or a remedy for the condition.

9. The method of claim 7, further comprising allocating an additional period of time for the vehicle to cease operating on the road surface based at least in part on the determination that the planner component acknowledged the indication, wherein the additional period of time expires after the expiration of the period of time.

10. The method of claim 7, wherein the condition is a fault associated with a component or system of the vehicle, the fault rendering the vehicle in a degraded but functional state.

11. The method of claim 7, wherein a type of the condition is at least one of:
a fault associated with a component or system of the vehicle;
a condition associated with an occupant of the vehicle;
an environmental condition; or
an emergency condition.

12. The method of claim 7, further comprising:
determining, based at least in part on the condition, to invoke a teleoperator associated with the vehicle; and sending, to a computing device associated with the teleoperator, a request for support in causing the vehicle to cease operating on the road surface, the request including an indication of the constraint.

13. The method of claim 7, wherein the road surface comprises a traffic lane and refraining from causing the vehicle to stop on the road surface in a way that the vehicle impedes the flow of traffic comprises refraining from causing the vehicle to stop in the traffic lane on the road surface.

14. The method of claim 7, wherein the monitoring component runs on a separate hardware device of the vehicle than the planner component.

15. The method of claim 7, further comprising:
 detecting at least one of a change to the condition necessitating that the vehicle cease operating on the road surface or a presence of another condition necessitating that the vehicle cease operating on the road surface; and
 at least one of extending or reducing a length of the period of time based at least in part on the change to the condition necessitating that the vehicle cease operating on the road surface or the presence of the other condition necessitating that the vehicle cease operating on the road surface.

16. One or more non-transitory computer-readable media storing instructions that, when executed, cause one or more processors to perform operations comprising:
 determining, by a monitoring component of a vehicle, a presence of a condition necessitating that a vehicle cease operating on a road surface;
 determining, by the monitoring component, a constraint associated with the vehicle ceasing operating on the road surface, the constraint including a period of time, the vehicle to cease operating on the road surface prior to an expiration of the period of time;
 sending, by the monitoring component and to a planner component of the vehicle, an indication that the vehicle is to cease operating on the road surface in accordance with the constraint; and
 based on a determination that the planner component acknowledged the indication in accordance with the constraint, refraining, by the monitoring component, from causing the vehicle to stop on the road surface in a way that impedes a flow of traffic;
 subsequent to the determination that the planner component acknowledged the indication, monitoring whether the vehicle has ceased operating on the road surface in accordance with the constraint; and
 based on a determination that the vehicle has continued operating on the road surface in violation of the constraint, causing the vehicle to stop on the road surface.

17. The one or more non-transitory computer-readable media of claim 16, wherein a length of the period of time is at least partially based on a cost associated with the condition, the cost determined based at least in part on at least one of a significance of the condition, a type of the condition, or a remedy for the condition.

18. The one or more non-transitory computer-readable media of claim 16, the operations further comprising allocating an additional period of time for the vehicle to cease operating on the road surface based at least in part on the determination that the planner component acknowledged the indication, wherein the additional period of time expires after the expiration of the period of time.

19. The one or more non-transitory computer-readable media of claim 16, wherein the condition is a fault associated with a component or system of the vehicle, the fault rendering the vehicle in a degraded but functional state.

20. The one or more non-transitory computer-readable media of claim 16, the operations further comprising:
 detecting at least one of change to the condition necessitating that the vehicle stop on the road surface or a presence of another condition necessitating that the vehicle stop on the road surface; and
 at least one of extending or reducing a length of the period of time based at least in part on the change to the condition necessitating that the vehicle stop on the road surface or the presence of the other condition necessitating that the vehicle stop on the road surface.

* * * * *